(12) United States Patent
Ikemachi et al.

(10) Patent No.: US 7,567,284 B2
(45) Date of Patent: Jul. 28, 2009

(54) ENCODER, LENS-IMPLEMENT AND DIGITAL CAMERA

(75) Inventors: Masaru Ikemachi, Tokyo (JP); Kazutoshi Shiratori, Tokyo (JP); Tomoaki Sato, Tokyo (JP)

(73) Assignee: Olympus Corporation, Tokyo (JP)

( * ) Notice: Subject to any disclaimer, the term of this patent is extended or adjusted under 35 U.S.C. 154(b) by 959 days.

(21) Appl. No.: 10/862,024

(22) Filed: Jun. 4, 2004

(65) Prior Publication Data

US 2005/0036056 A1    Feb. 17, 2005

(30) Foreign Application Priority Data

| Jun. 17, 2003 | (JP) | ............................. 2003-172142 |
| Jun. 17, 2003 | (JP) | ............................. 2003-172154 |
| Jun. 17, 2003 | (JP) | ............................. 2003-172159 |
| Jun. 17, 2003 | (JP) | ............................. 2003-172169 |

(51) Int. Cl.
G02B 13/16 (2006.01)
G02B 23/24 (2006.01)
H04N 5/225 (2006.01)
H04N 5/238 (2006.01)

(52) U.S. Cl. ....................... 348/335; 348/344; 348/369; 359/362

(58) Field of Classification Search ......... 348/335–369; 359/362–435
See application file for complete search history.

(56) References Cited

U.S. PATENT DOCUMENTS

| 4,195,922 | A | * | 4/1980 | Hajnal | .......................... 348/335 |
| 5,448,319 | A | * | 9/1995 | Iuzawa | ........................ 396/419 |
| 6,288,848 | B1 | * | 9/2001 | Shinohara et al. | ........... 359/696 |
| 6,324,023 | B1 | | 11/2001 | Nagaoka et al. | |
| 6,754,446 | B2 | * | 6/2004 | Hagimori et al. | .............. 396/72 |
| 6,829,011 | B1 | * | 12/2004 | Higuchi et al. | .............. 348/340 |
| 6,850,279 | B1 | * | 2/2005 | Scherling | .................... 348/335 |
| 7,012,647 | B2 | * | 3/2006 | Shintani | ..................... 348/374 |
| 7,345,705 | B2 | * | 3/2008 | Croasdale | ................... 348/335 |

(Continued)

FOREIGN PATENT DOCUMENTS

JP         06-311765        11/1994

(Continued)

OTHER PUBLICATIONS

Notice of Rejection Grounds for Japanese Patent Application No. 2003-172142, mailed Apr. 22, 2008 (3 pgs.) with translation (3 pgs.).

(Continued)

*Primary Examiner*—David L Ometz
*Assistant Examiner*—Richard M Bemben
(74) *Attorney, Agent, or Firm*—Straub & Pokotylo; John C. Pokotylo

(57) ABSTRACT

All members of a lens-implement are arranged in a rectangular space of a main lens frame. A lens prism is fixed, three movable lens frames for zoom and focusing inserted the two guide shafts are arranged, and a image capturing lens is fixed top-to-bottom seriatim occupying the horizontal ⅔ portion of the rectangular space, and the image capturing device is arranged at foot portion. A zoom motor is arranged at the back of the lens prism, and a zoom shaft cam, a diaphragm/shutter, a focusing ultrasonic linear motor, and a magnetic sensor are arranged along the lens frames.

17 Claims, 17 Drawing Sheets

U.S. PATENT DOCUMENTS

2004/0095503 A1* 5/2004 Iwasawa et al. .............. 348/344
2004/0109076 A1* 6/2004 Yokota et al. ................ 348/335
2004/0135915 A1* 7/2004 Ueda et al. ................... 348/335

FOREIGN PATENT DOCUMENTS

| JP | 08-205017 | | 8/1996 |
| JP | 09-033782 | A | 2/1997 |
| JP | 09-061692 | A | 3/1997 |
| JP | 09-127397 | | 5/1997 |
| JP | 09-230191 | | 9/1997 |
| JP | 11-258678 | * | 9/1999 |
| JP | 2000-2559 | A | 1/2000 |
| JP | 2000-039670 | | 2/2000 |
| JP | 2002-040317 | | 2/2002 |
| JP | 2002-290806 | A | 10/2002 |
| JP | 2003-066309 | A | 3/2003 |
| JP | A-2003-91033 | | 3/2003 |

OTHER PUBLICATIONS

Notice of Rejection Grounds for Japanese Patent Application No. 2003-172154, mailed May 7, 2008 (3 pgs.) with translation (3 pgs.).
Notice of Rejection Grounds for Japanese Patent Application No. 2003-172159, mailed May 27, 2008 (3 pgs.) with translation (2 pgs.).

* cited by examiner

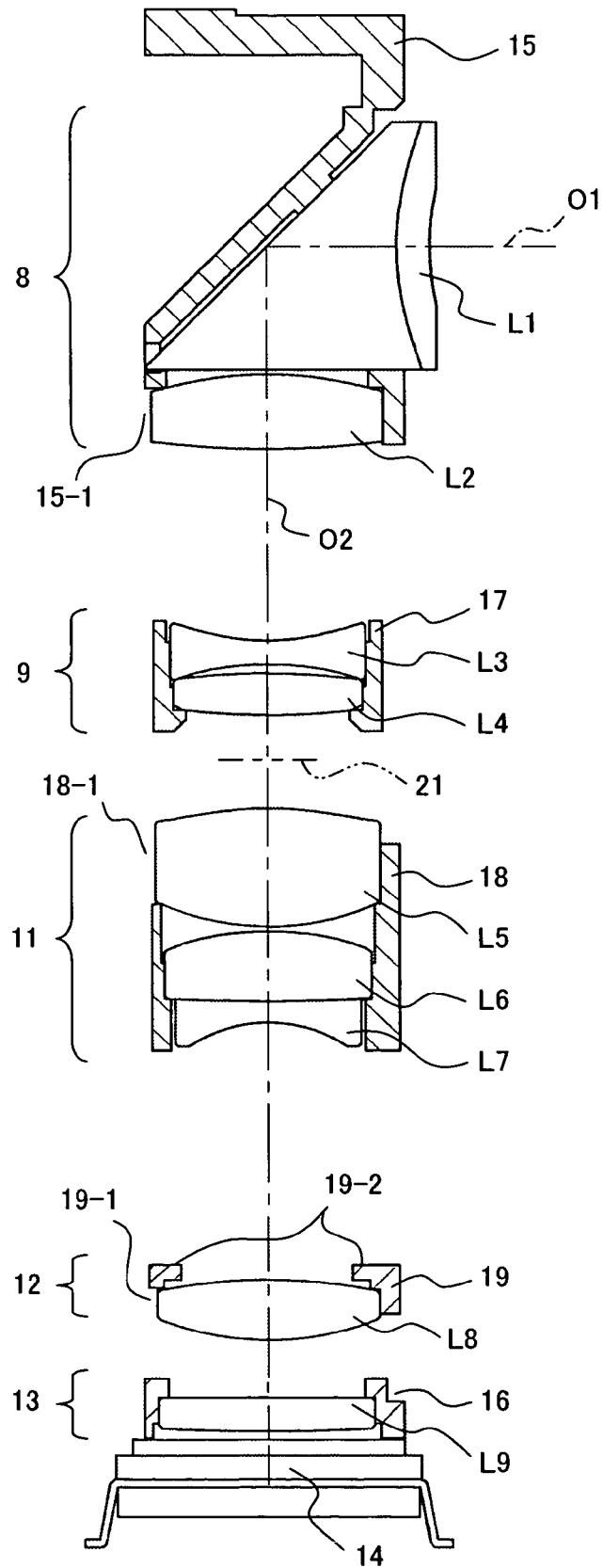
F I G. 2

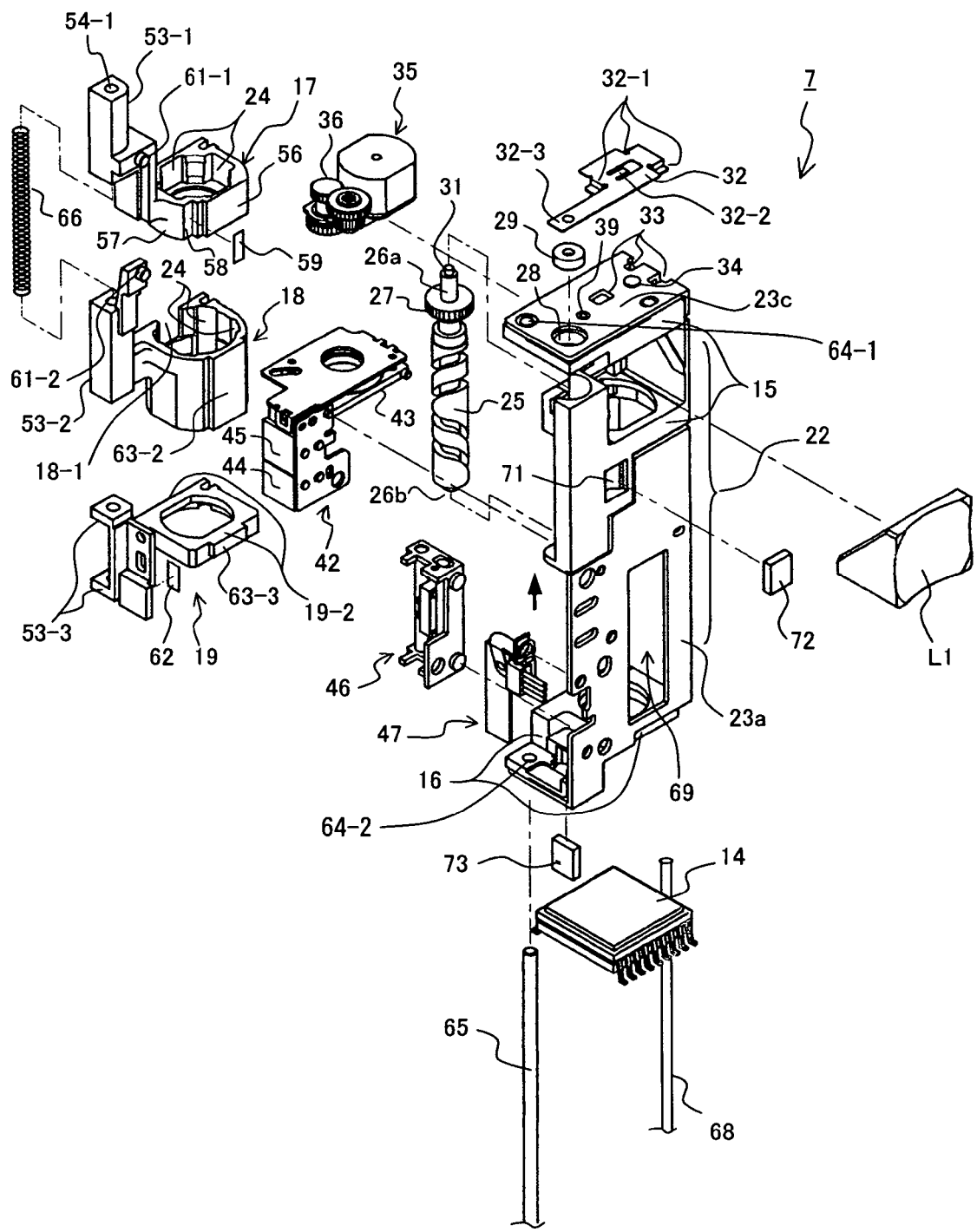
F I G. 3

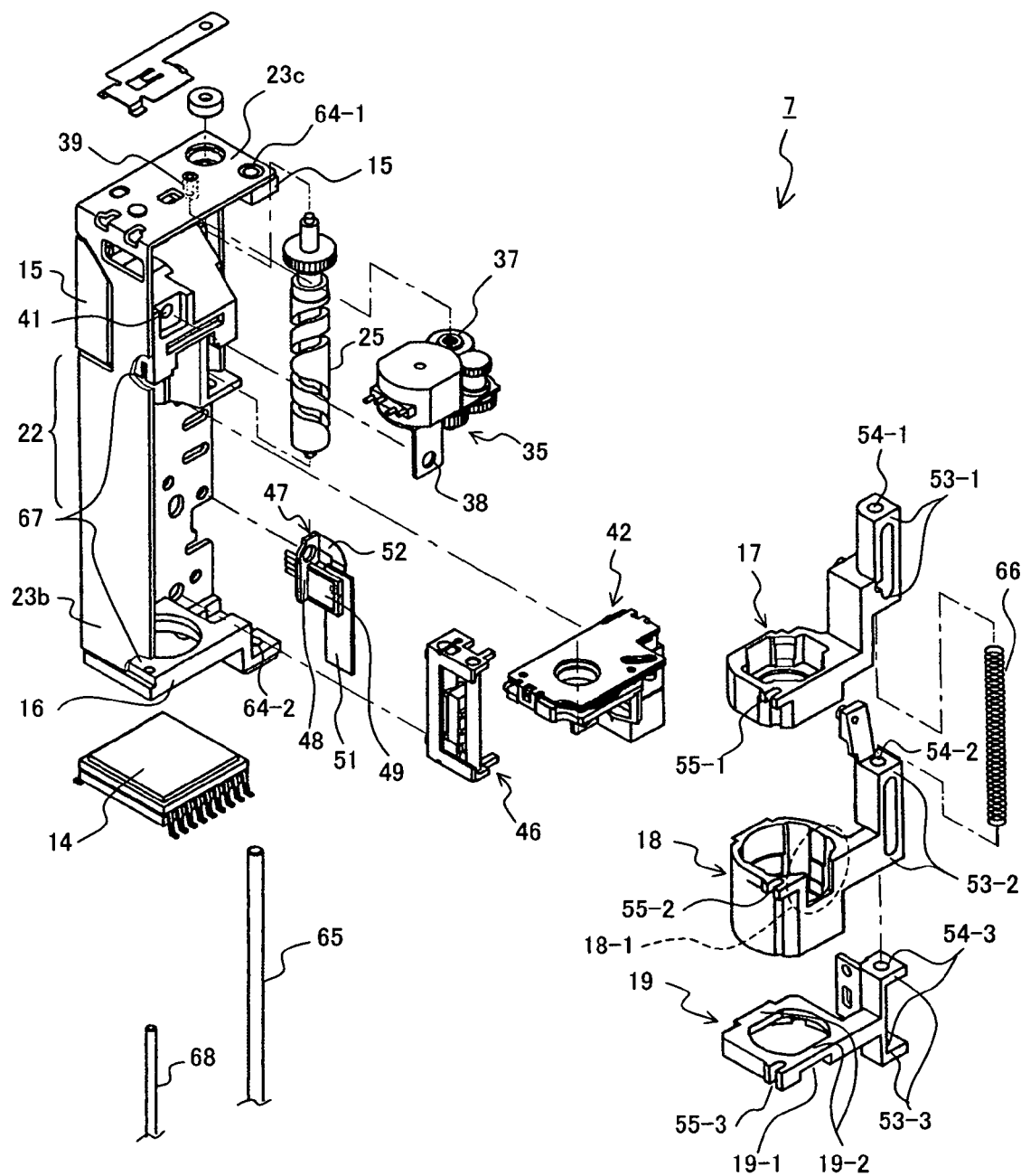
F I G. 4

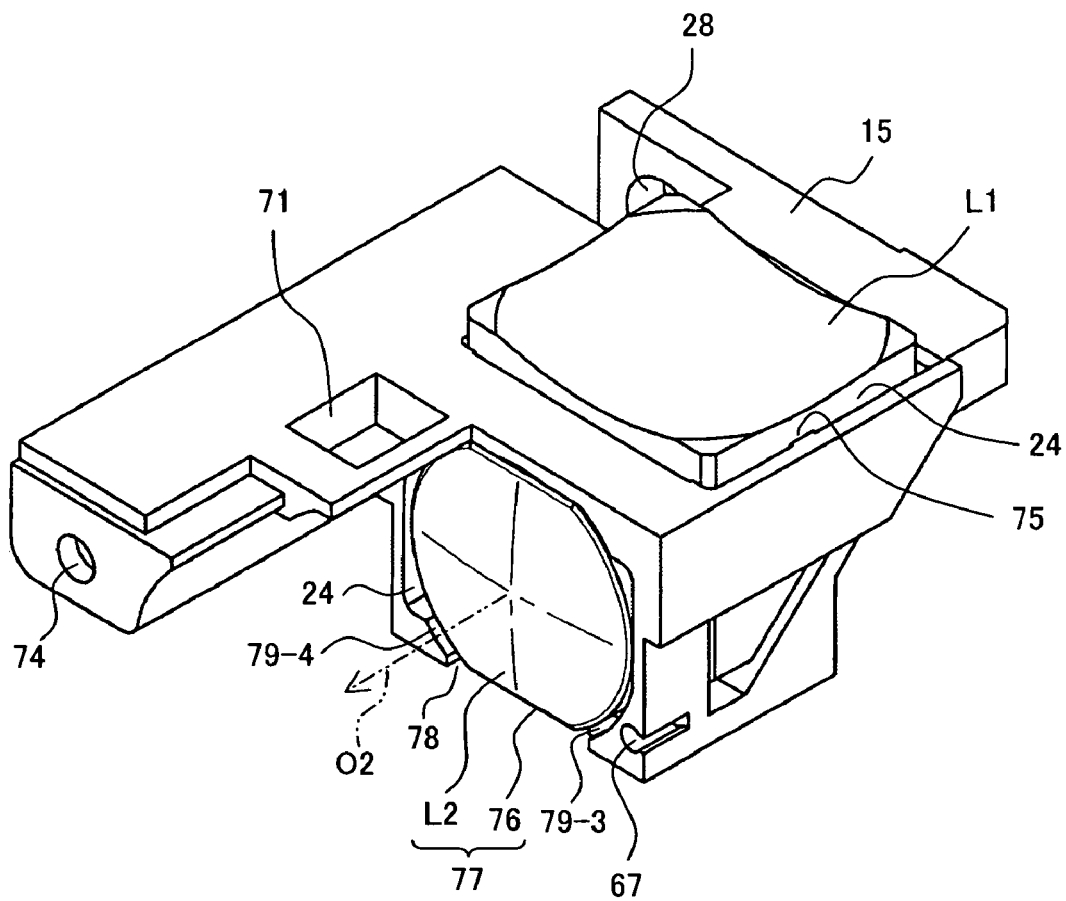
F I G. 5A
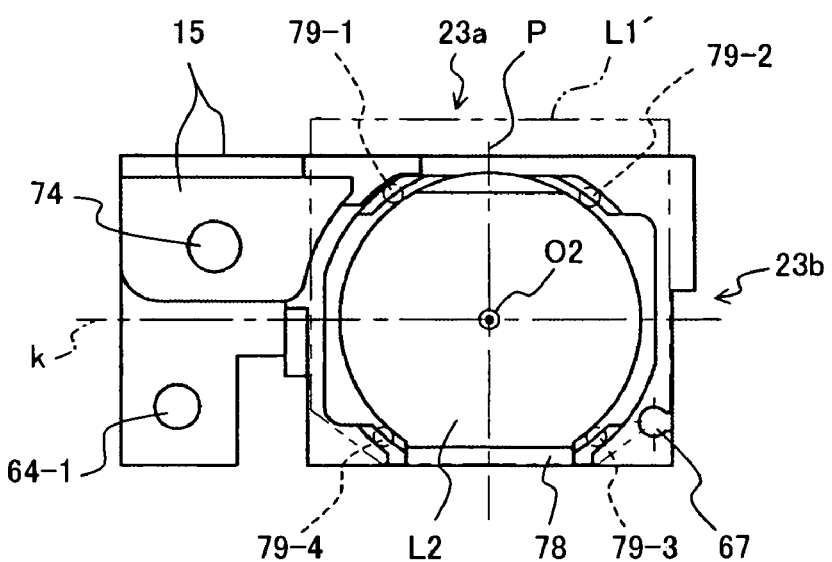
F I G. 5B

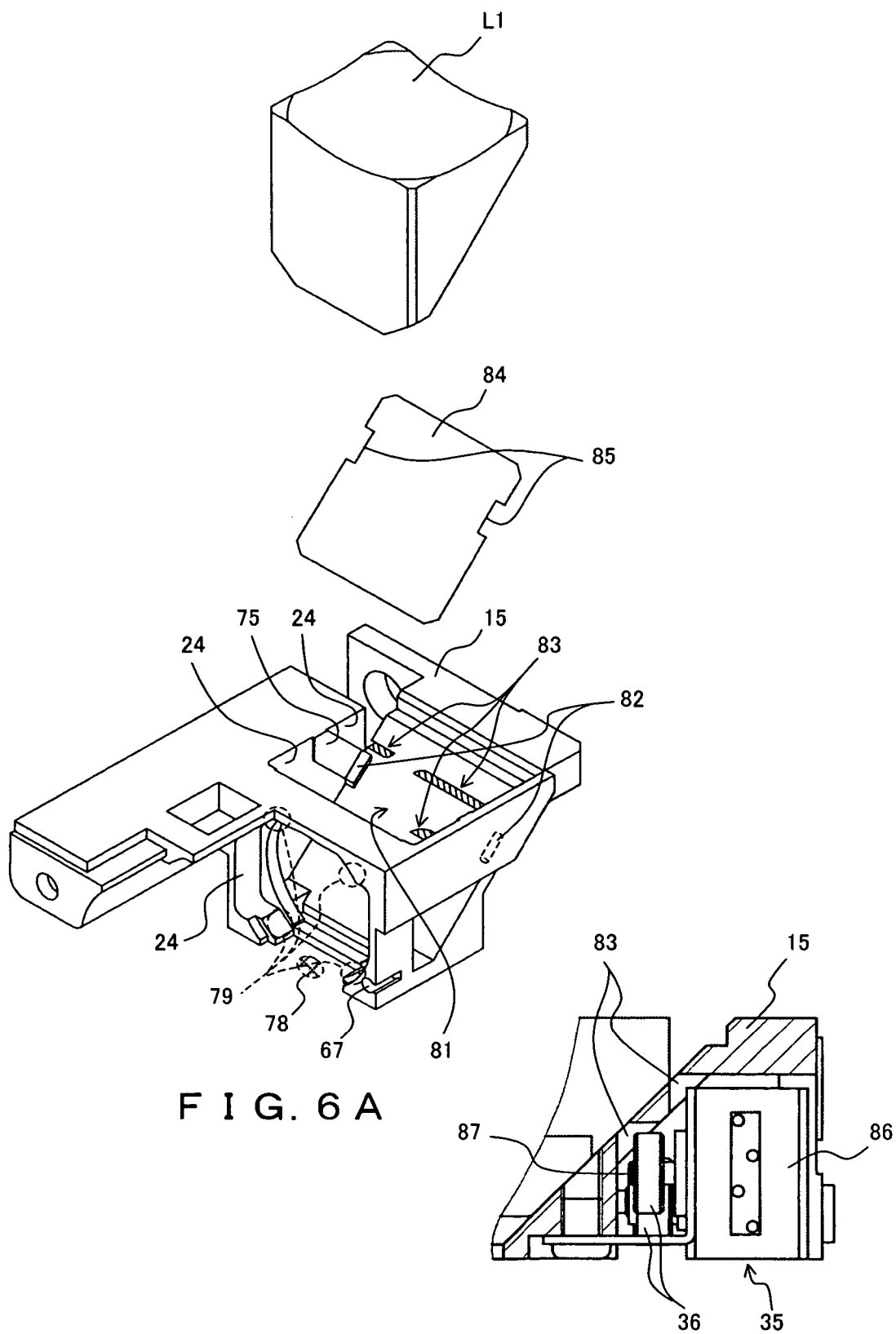
F I G. 6 A
F I G. 6 B

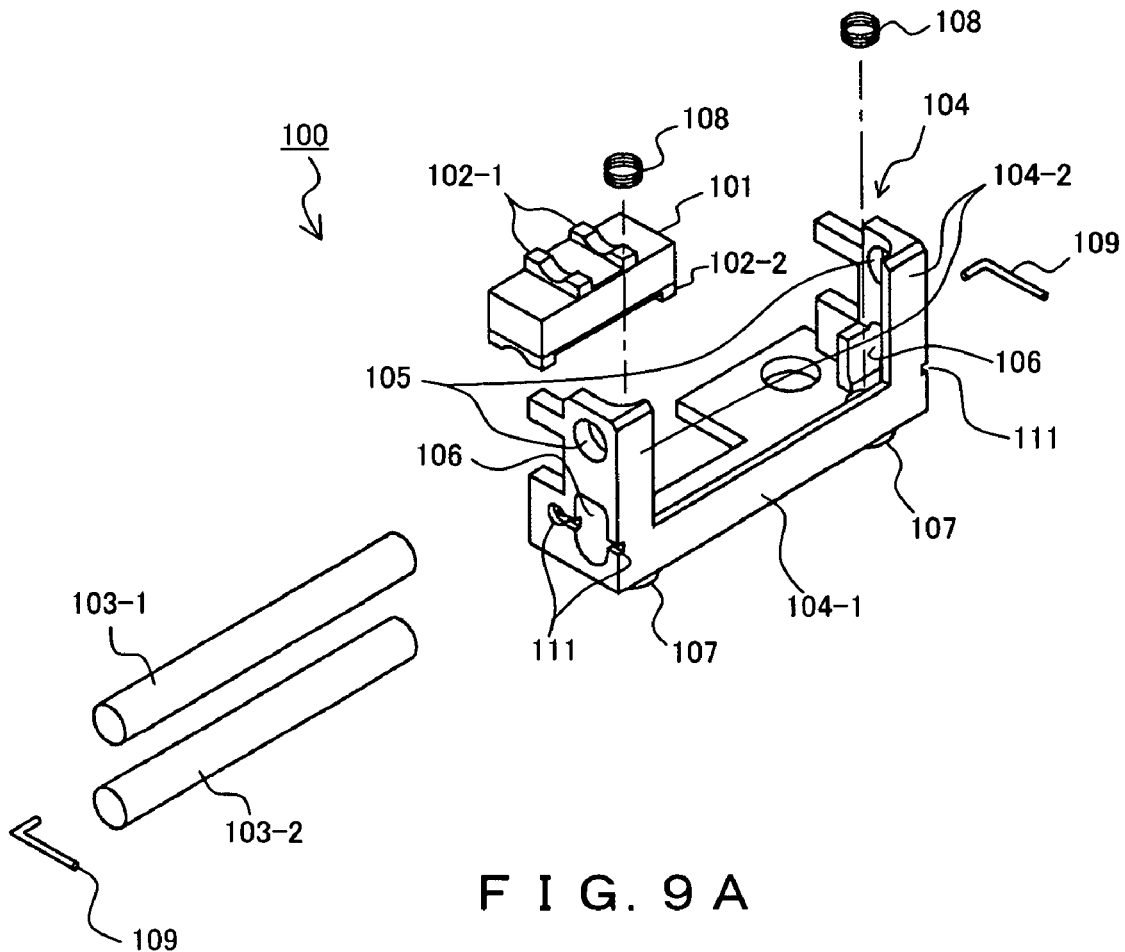
F I G. 9 A
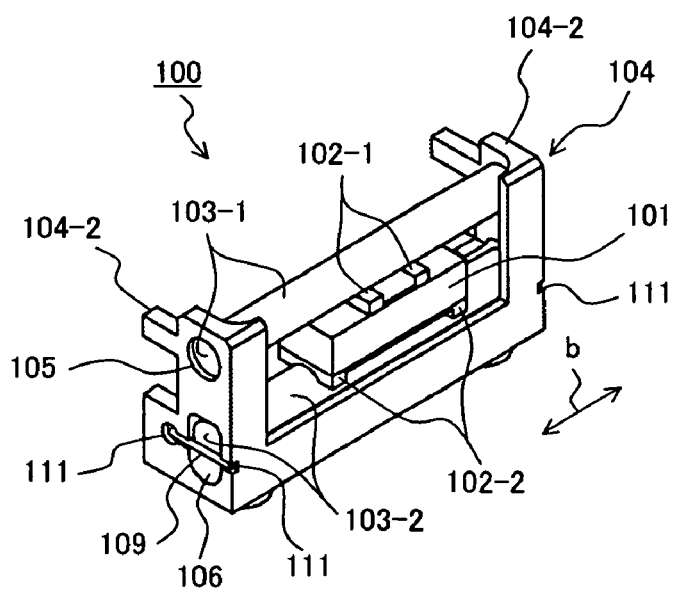
F I G. 9 B

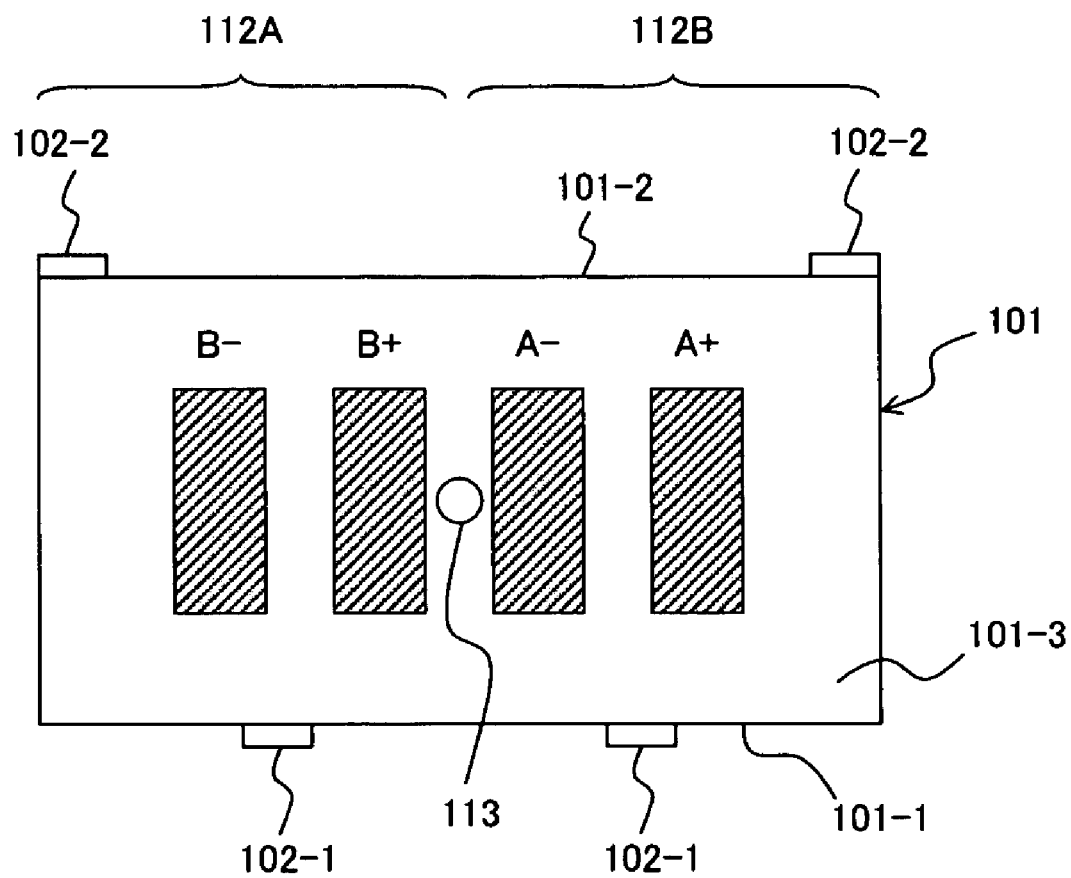
F I G. 1 0

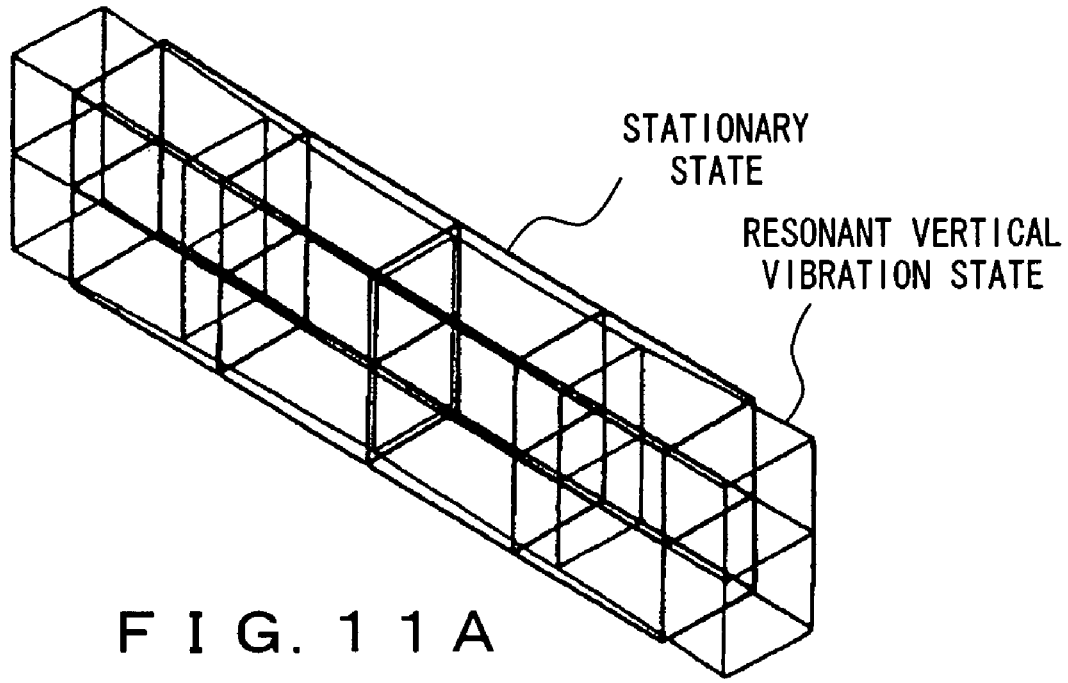
F I G. 1 1 A
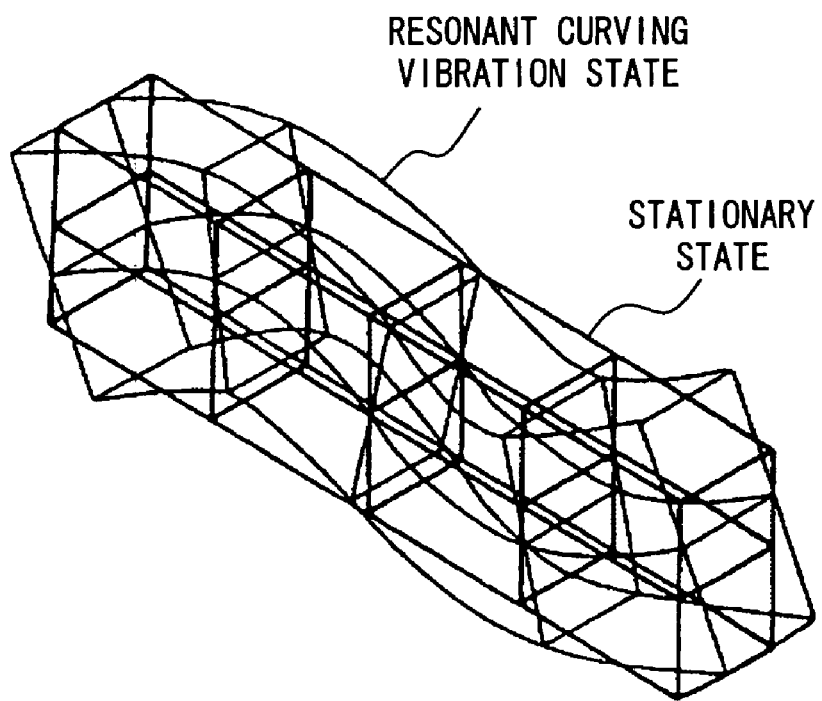
F I G. 1 1 B

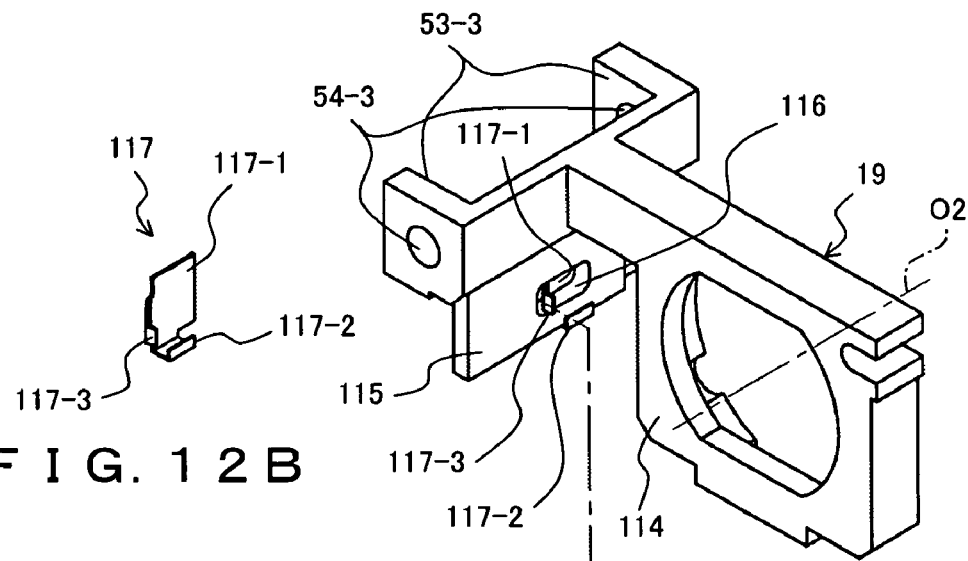
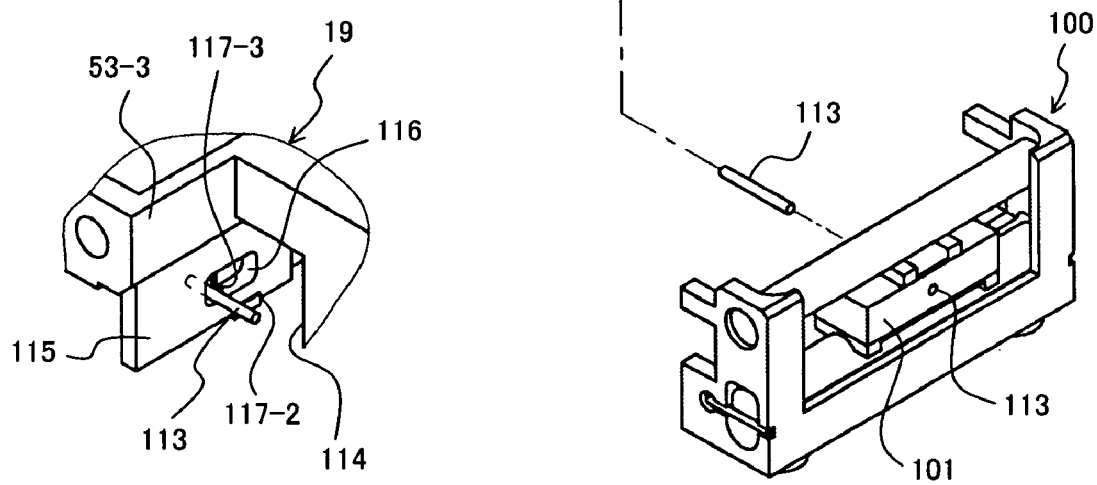
FIG. 12B
FIG. 12C  FIG. 12A

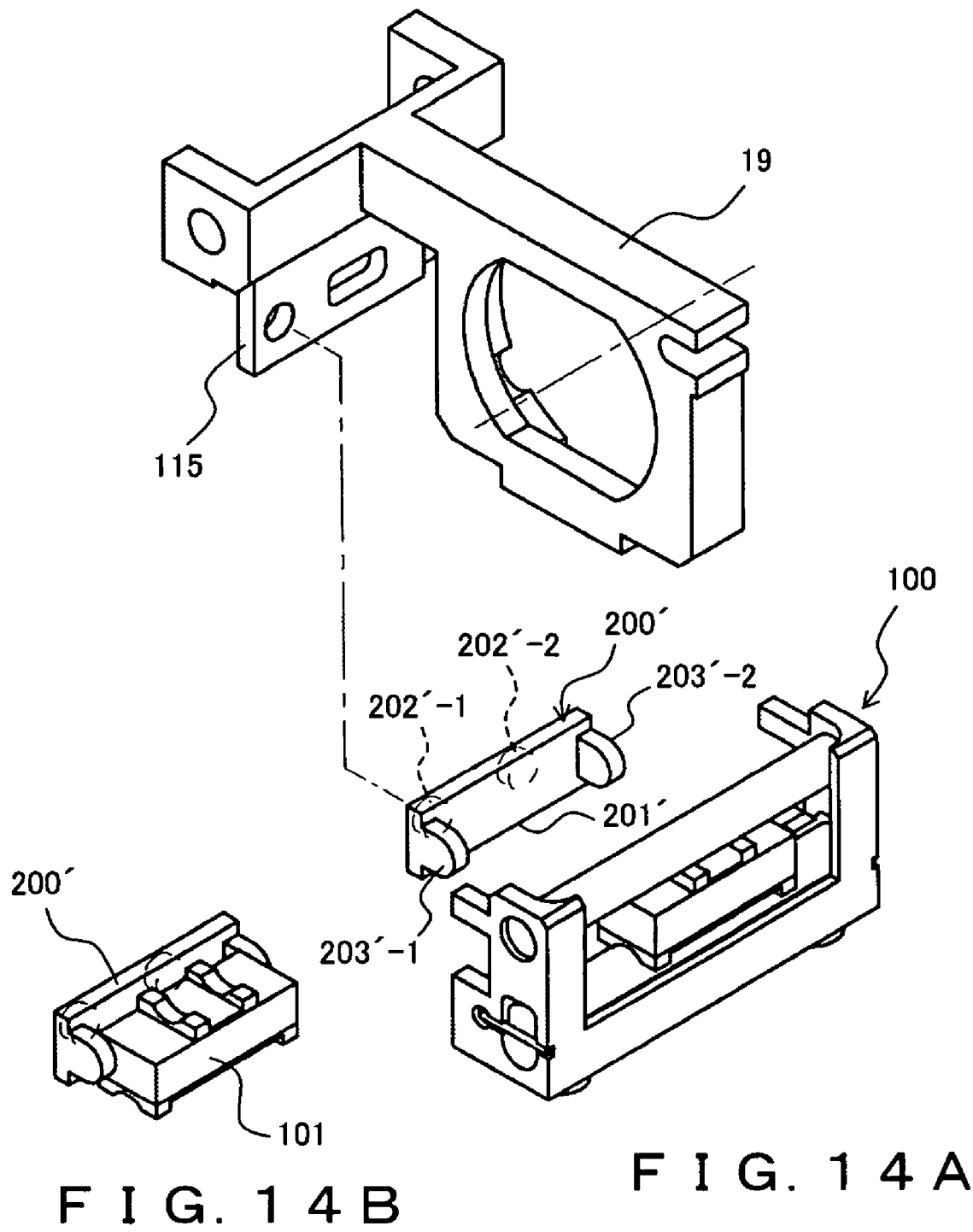
F I G. 1 4 B
F I G. 1 4 A

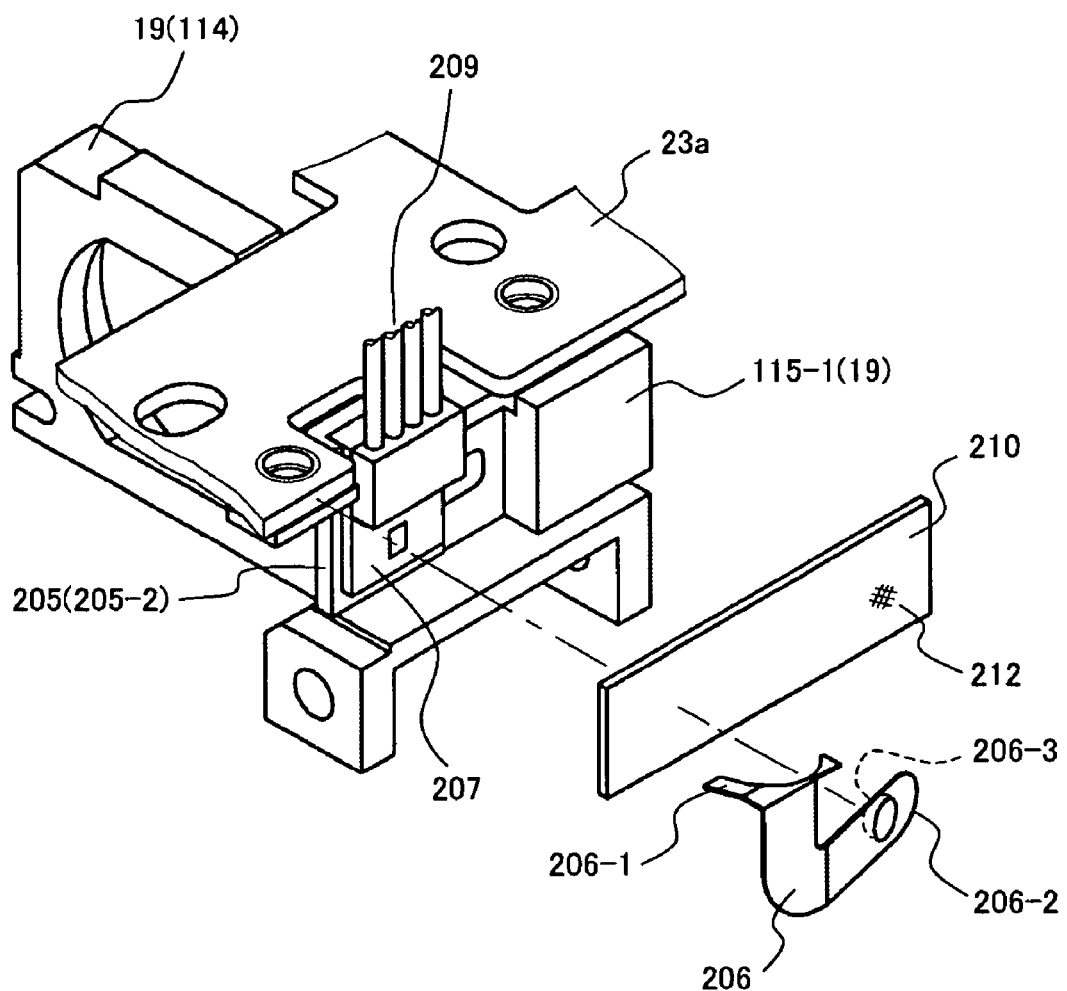
F I G. 1 6

ENCODER, LENS-IMPLEMENT AND DIGITAL CAMERA

CROSS REFERENCE TO RELATED APPLICATION

This application is based upon and claims the benefit of priority from the prior Japanese Application No. 2003-172159, No. 2003-172142, No. 2003-172154, No. 2003-172169, filed Jun. 17, 2003, the entire contents of which are incorporated herein by reference.

BACKGROUND OF THE INVENTION

1. Field of the Invention

The present invention relates to a simple architectonics high-precision encoder, a slim lens-implement using the encoder, and a digital camera using the lens-implement.

2. Description of the Related Art

Conventionally, with a growing demand for a smaller and slimmer digital camera in the digital camera market, a slim lens-implement incorporated into a digital camera has been required.

As one of the methods of providing a slimmer lens-implement, a lens-implement based on a bent-optical-axis optical system has been proposed. For a slimmer device, the Applicant has proposed a lens-implement configured by arranging in parallel a plurality of units forming a lens-implement (for example, a patent literature 1).

For a lens-implement based on the slimmer and bent-optical-axis optical system, an electronic zoom is not demanded in the recent digital camera market, but a request for an optical zoom is growing. Therefore, a lens-implement of a bent-optical-axis optical system having a built-in optical zoom has been proposed. (For example, refer to Japanese Patent Application Laid-open No. 2003-066309, abstract, FIGS. 3 and 5; Japanese Patent Application Laid-open No. 2002-290806, claim 6, paragraphs [0038] and [0041], FIGS. 2 and 3.) In the lens-implement of a conventional camera, a lens frame unit holding a lens for a zoom and focusing is freely transferred in the optical axis direction at an instruction from a control device.

Since a lens frame unit and a drive unit for driving the lens frame unit are individually manufactured, a coupling mechanism is required to transmit a driving force to transmit the driving force of the drive unit to the lens frame unit.

In this case, it is necessary to amend various displacements such as the displacement between the units, the displacement in the horizontal direction relative to the lens frame unit, etc. However, there have been the methods for coupling the units with the above-mentioned displacements easily absorbed and amended. Among them, for example, there is a configuration proposed in which a spring member that indicates elastic deformation is used for a coupling member, and the spring member has the elasticity allowing a deformation on the plane normal to the optical axis or perpendicular to the optical axis while the spring member has no elasticity in the optical axis direction. (For example, refer to Japanese Patent Application Laid-open No. Hei 09-061692, paragraph [0018], FIG. 1, and Japanese Patent Application Laid-open No. Hei 09-033782, abstract, and FIG. 1.)

As a type of encoder for continuously detecting the position, a position detection device using a magnetic resistance element is proposed. The position detection device is a high-precision, possible down sizing and capable of easily consecutive detecting transfer positions, and therefore is specifically used in detecting an amount of transfer of a lens.

In the meantime, the position detection device using the magnetic resistance element has the problem that a magnetic sensor cannot correctly read the magnetic scale unless the magnetic resistance element (magnetic sensor) and the magnetic scale can be maintained at a predetermined interval.

Accordingly, there has been the position detection device proposed by providing a simple adjusting mechanism to maintain a constant interval between the magnetic sensor and the magnetic scale (for example, see Abstract of the Disclosure, and FIG. 1 of Japanese Patent Application Laid-open No. 2000-002559.)

SUMMARY OF THE INVENTION

The lens-implement according to the present invention has the body of the implement formed by two opposing main rectangular surfaces and a planiform space enclosed by the two main surfaces provided with a plurality of optical elements along the direction of the length of the main rectangular, and includes a metal frame forming at least one main surface of the above-mentioned main surfaces, and a mold unit incorporated into the metal frame.

The lens-implement further includes: a reflective optical element for directing the optical axis of incident light by reflecting the incident light; a movable lens frame arranged on the second optical axis which is the directed optical axis, and arranged as movable along the second optical axis; and a drive unit for driving the movable lens frame. The drive unit includes a cam member as an axis with a cam portion for positioning the movable lens frame formed on the circumference; and a motor for rotating the cam member. The cam member is configured with the central axis arranged parallel to the second optical axis near the reflective optical element.

The lens-implement includes a lens frame provided as freely movable in the optical axis direction; a self-moving unit for freely moving parallel to the optical axis; and coupling unit having a movement transmission member one end of which is fixed to the self-moving unit while the other end of which touches the lens frame and a propelling member for propelling the movement transmission member to the touch portion of the lens frame with a view to coupling the self-moving unit with the lens frame.

The encoder according to the present invention includes: a magnetic sensor attached to a stationary member; a magnetic scale arranged with one portion fixed to a movable member such that relative travel can be attained with respect to the magnetic sensor with the scale face directed toward the magnetic sensor; and a pressure unit attached to the stationary member for pressing the portion not fixed to the movable member of the magnetic scale against the magnetic sensor from the opposite side of the scale surface so that the scale surface of the magnetic scale can slide against the detection unit of the magnetic sensor.

Furthermore, the digital camera is configured by loading a lens-implement with the above-mentioned encoder attached thereto.

BRIEF DESCRIPTION OF DRAWINGS

FIG. 2 is a left side view of the digital camera along the line A-A' of the lens-implement of the digital camera according to an embodiment of the present invention;

FIG. 3 is an exploded perspective view of the lens-implement of the digital camera according to an embodiment of the present invention when viewed from the front of the digital camera;

FIG. 4 is an exploded perspective view of the lens-implement of the digital camera according to an embodiment of the present invention when viewed from the back of the digital camera;

FIG. 5A is a perspective view showing turn around the enlarged view of the configuration of the first fixed lens frame unit according to an embodiment of the present invention;

FIG. 5B is shows the configuration viewed from the directed optical axis direction;

FIG. 6A is a exploded perspective view of a member incorporated into the first fixed lens frame unit;

FIG. 6B is a side view of a zoom motor unit incorporated into the first fixed lens frame unit;

FIG. 9A is a exploded perspective view of the ultrasonic linear motor according to an embodiment of the present invention;

FIG. 9B is a perspective view of the assembled status of the ultrasonic linear motor;

FIG. 10 shows the wiring for the electrode to the vibrator of the ultrasonic linear motor according to an embodiment of the present invention;

FIGS. 11A and 11B are perspective schematic chart of the ultrasonic vibration of the vibrator of the ultrasonic linear motor according to an embodiment of the present invention;

FIG. 12A is a perspective view showing the method of connecting the ultrasonic linear motor with the third movable lens frame according to an embodiment of the present invention;

FIG. 12B is a perspective view showing the leaf spring for use in the coupling;

FIG. 12C is a perspective view of the coupling unit only;

FIGS. 14A and 14B are perspective views showing a further method of connecting the ultrasonic linear motor with the third movable lens frame;

FIG. 16 shows an example of a variation (1) of the magnetic sensor according to an embodiment of the present invention.

DESCRIPTION OF THE PREFERRED EMBODIMENTS

Figure 1A:
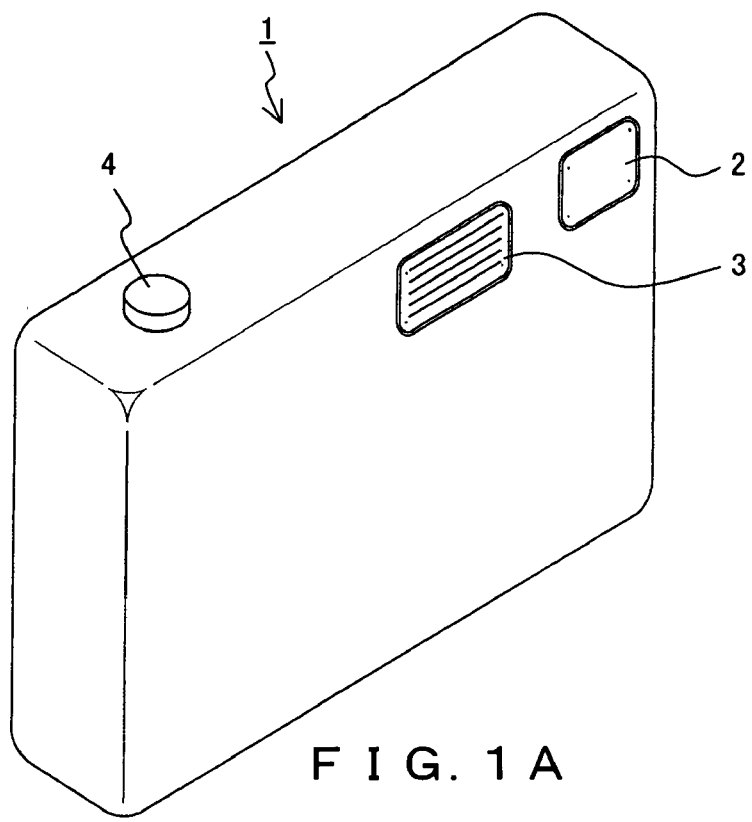
FIGS. 1A and 1B roughly show the configuration of the digital camera according to an embodiment of the present invention.

The embodiments of the present invention are explained below by referring to the attached drawings. In the following explanation, the above-mentioned one main surface is formed by, for example, the surface of a metal frame 23a and the surface of a first fixed lens frame unit 15, etc. incorporated into the metal frame 23a. The other opposing main surface is an open surface. The optical element is formed by, for example, a prism L1, lenses L2 through L9, etc. The reflective optical element is formed by the prism L1, etc. The mold unit is formed by, for example, the first fixed lens frame unit 15, a second fixed lens frame unit 16, etc. One side is formed by, for example, a metal frame 23b, and the other side is an open surface. A first guide member is formed by, for example, a first guide shaft 65, etc., and a second guide member is formed by a second guide shaft 68, etc. A first guide member support unit is formed by, for example, guide shaft support holes 64 (64-1, 64-2), etc. and a second guide member support unit is formed by guide shaft support holes 67, etc.

Figure 1B:
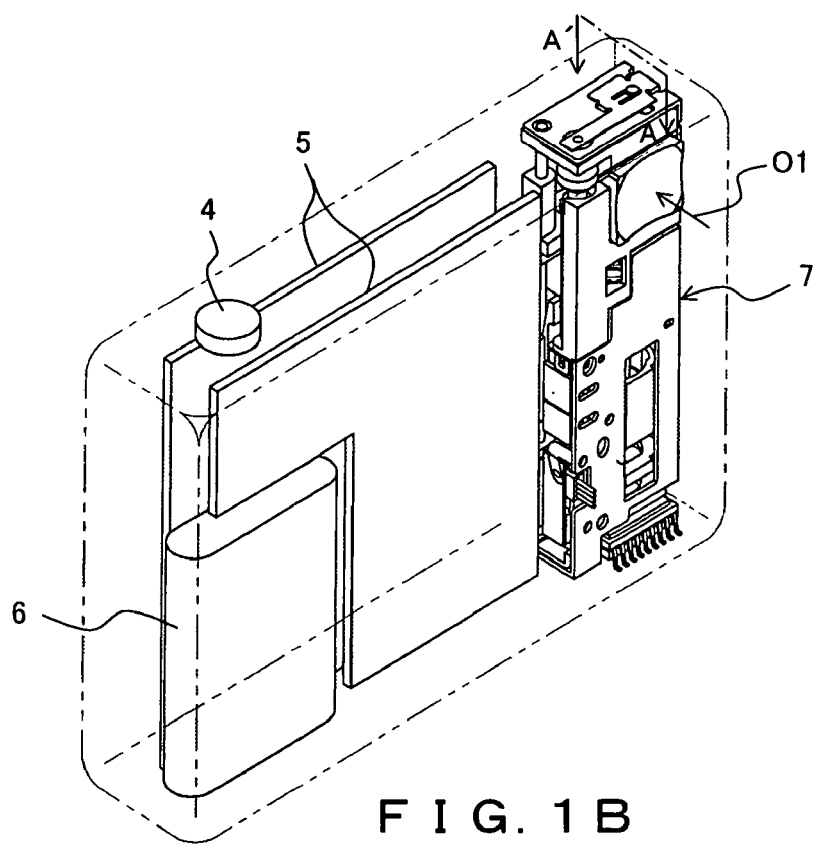

FIGS. 1A and 1B roughly show the configuration of the digital camera according to an embodiment of the present invention. FIG. 1A is a perspective view of the appearance of the digital camera viewed from the front. FIG. 1B is a perspective view showing the arrangement of the important portion inside the digital camera.

As shown in FIG. 1A, a digital camera 1 has a taking lens window 2 at the upper right corner of the front surface, and a strobe light emission window 3 to the left of the taking lens window 2. A release button 4 is mounted on the left end of the top surface.

As shown in FIG. 1B, a control device comprising a circuit substrate 5 loaded with various electronic parts, a removable battery 6, etc. are arranged in the space inside the digital camera 1 occupying an approximately ⅔ portion on the left inside the digital camera 1. Then, a unit of a lens-implement 7 is arranged in the approximately ⅓ portion on the right inside the digital camera 1.

The lens-implement 7 reflects the ray flux from the subject along a taking optical axis O1 shown in FIG. 1B through the taking lens window 2 shown in FIG. 1A and directs it about 90° downward, and the input ray flux is led to the image pickup device comprising, for example, a CCD, etc. provided at the lower end portion of the lens-implement 7 along a second optical axis O2 directed downward as described later, thereby generating a captured image.

FIG. 2 shows the digital camera 1 viewed from the left side shown in FIG. 1B along the line A-A' through the lens-implement 7 shown in FIG. 1B, and shows the rough configuration of each portion of the lens unit.

As shown in FIG. 2, the lens-implement 7 comprises in the inside a plurality of lenses including a first fixed lens unit 8 comprising the prism L1 and the lens L2 along the second optical axis 02 directed downward, a first movable lens unit 9 comprising the lens L3 and the lens L4, a second movable lens unit 11 comprising the lens L5, the lens L6, and the lens L7, a third movable lens unit 12 comprising the lens L8, and the second fixed lens unit 13 comprising the lens L9. An image pickup device 14 is provided at the end of the above-listed lenses.

The prism L1 of the first fixed lens unit 8 reflects and directs about 90° downwards the ray flux from the subject input along the taking optical axis O1 through the above-mentioned taking lens window 2, and the prism which changes the direction of the ray flux along the second optical axis O2 is laminated with a normal lens into an incorporated unit. The resultant unit is held with the lens L2 in the first fixed lens frame unit 15 and fixed in the lens-implement 7. The lens can be incorporated with the prism without lamination. The second fixed lens unit 13 is held in the second fixed lens frame unit 16, and fixed in the lens-implement 7.

The first fixed lens frame unit 15 and the second fixed lens frame unit 16 are formed as resin molds as incorporated at the end in the direction of the length of the metal frame which is described later and has an L-character shaped section normal to the second optical axis 02.

A first movable lens frame 17 holding the first movable lens unit 9, a second movable lens frame 18 holding the second movable lens unit 11, and a third movable lens frame 19 holding the third movable lens unit 12 are mounted between the first fixed lens frame unit 15 and the second fixed lens frame unit 16.

The first movable lens frame 17, the second movable lens frame 18, and the third movable lens frame 19 respectively hold the first movable lens unit 9, the second movable lens unit 11, and the third movable lens unit 12 in a way such that they can be independently movable along the second optical axis O2 directed substantially normal to the prism L1.

The first movable lens unit 9 and the second movable lens unit 11 are mounted to change the focal distance of the ray flux of the subject input along the second optical axis O2 of the optical system of the lens-implement 7. That is, the first movable lens frame 17 and the second movable lens frame 18 respectively holding the first movable lens unit 9 and the second movable lens unit 11 are mounted to adjust the zoom ratio of the lens system.

The third movable lens unit 12 is mounted to adjust the focusing position in which the above-mentioned ray flux forms an image on the image pickup device 14. That is, the third movable lens frame 19 for holding the third movable lens unit 12 is mounted as a lens frame for focusing as freely movable in the direction of the second optical axis O2.

A diaphragm position (which can be a shutter position) 21 is set between the first movable lens unit 9 and the second movable lens unit 11.

The lens unit is configured such that the thickness (depth) of the unit can be the smallest possible, and a part or all of the front or back along the second optical axis O2 (the backward portion of the digital camera 1 in the example shown in FIG. 2) of the frame structures of the first fixed lens frame unit 15, the second movable lens frame 18, and the third movable lens frame 19 respectively supporting the first fixed lens unit 8, second movable lens unit 11, and the third movable lens unit 12 respectively including the lenses L2, L5, and L8 having relatively large diameters are cut out to form the cut out portions 15-1, 18-1, and 19-1.

For the second and the third movable lens frames 18 and 19, the strengths of which become weak by the amount of the cut frame walls, and which do not have another reinforced portion unlike the first fixed lens frame 15, a convex part which protrudes externally and will be described later, is provided on a side opposite to the cut parts with reference to the second optical axis O2, namely, on the frame walls on the top surface. The reason why the frame walls of the second and the third movable lens frames 18 and 19 on the top surface look slightly thick in FIG. 1B is that the cross sections of the convex parts are depicted.

Additionally, since the whole of the third movable lens frame 19 is thin and weak in the direction of a width, it can be possibly insufficient to make reinforcement only with the above described convex parts. Therefore, a protruding part 19-2 is provided to wrap from a lens barrel part formed on a side opposite to the cut part 19-1 formed at the bottom of the lens L8 toward the left hand side, which is out of range of the effective light beam of the lens L8.

FIG. 3 is a exploded perspective view of the lens-implement 7 viewed from the front of the digital camera 1.

FIG. 4 is a exploded perspective view of the lens-implement 7 viewed from the back of the digital camera 1.

In FIGS. 3 and 4, the components also shown in FIGS. 1 and 2 are assigned the same reference numerals assigned in FIGS. 1 and 2.

As shown in FIGS. 3 and 4, the lens-implement 7 comprises a main fixed lens frame 22. When all components shown in FIG. 3 or 4 are mounted and stored inside and outside the main fixed lens frame 22, the entire components form the outline of the body of the implement formed by two opposing rectangular main surfaces and the rectangular parallelepiped space enclosed by the two main surfaces.

The main fixed lens frame 22 forms at least one main surface of the above-mentioned two main surfaces. With the configuration of the lens-implement 7, the other main surface is open. On side of the rectangular parallelepiped space enclosed by the main surface formed by the metal frame 23a and the other open main surface is also formed by the metal frame 23b mounted substantially normal to the metal frame 23a.

The side in the direction normal to the length (upper side direction normal to the length in FIGS. 3 and 4) is formed by a metal frame 23c mounted substantially normal to the metal frame 23a of the main surface and the metal frame 23b on the side in the direction of the length.

Thus, a metal frame 23 (23a, 23b) forms an L-shaped frame by a section normal to the direction of the length (also the direction of the second directed optical axis O2) as one main surface and a side in the direction of the length to produce a frame of an ideal structure having sufficient rigidity using a small amount of material.

At one end portion in the direction of the length of the metal frame 23, a fixed mold unit is incorporated into the metal frame 23 in an outsert molding. These two fixed mold units are the first fixed lens frame unit 15 and the second fixed lens frame unit 16 shown in FIG. 2.

The first fixed lens frame unit 15 includes the prism L1 shown in FIG. 2 and the lens L2 omitted in FIGS. 3 and 4 in a fixed state. The second fixed lens frame unit 16 fixedly holds the lens L9 shown in FIG. 2 but omitted in FIGS. 3 and 4.

Between the first fixed lens frame unit 15 and the second fixed lens frame unit 16, the three movable lens frames also shown FIG. 2 (the first movable lens frame 17, the second movable lens frame 18, and the third movable lens frame 19) are arranged.

These three movable lens frames and the above-mentioned two fixed lens frames are provided with an adhesive catch unit 24 (refer to FIG. 3) for holding and fixing each lens. The adhesive catch unit 24 is a small space portion formed between the circumferential side of a fixed lens and the lens frame.

The adhesive catch units of the third movable lens frame 19 and the second fixed lens frame unit 16 cannot be seen in FIG. 3 because they are hidden. The adhesive catch unit of the first fixed lens frame unit 15 is described later.

Before the above-mentioned three movable lens frames are incorporated, a zoom shaft cam 25 is arranged close to side portion in the direction of the length on the open side of the main fixed lens frame 22 and the side of the first fixed lens frame unit 15. The zoom shaft cam 25 has a large diameter part having the bottom of the cam groove of the cam member and forming the circumferential side, and a small diameter part 26 (26a, 26b) coaxially projected from both ends of the large diameter part. A gear 27 is fixed to the small diameter part 26a projected to the end portion opposite the image pickup device 14.

The zoom shaft cam 25 passes the small diameter part 26a through a bearing engagement hole 28 formed in the incorporated and fused portion with the metal frame 23c of the first fixed lens frame unit 15, pulls it downwards with the small diameter part 26b engaged into the bearing hole formed in the first fixed lens frame unit 15 not seen in FIG. 3 because it is hidden, and allows the small diameter part 26*a* to be engaged with a shaft bearing 29 in the bearing engagement hole 28. Thus, the zoom shaft cam 25 can be supported as rotating for the first fixed lens frame unit 15.

A small convex portion 31 having a further smaller diameter is formed at the projection of the small diameter part 26*a* of the zoom shaft cam 25. The convex portion 31 projects upward and outside from the shaft bearing 29 when the small diameter part 26*a* is engaged with the shaft bearing 29. By pressing the convex portion 31 with the propelling force of a propelling leaf spring 32, the zoom shaft cam 25 is positioned by the upper and lower bearings, and held stably.

The propelling leaf spring 32 is configured by three curved leg portions 32-1 separated from the substantially rectangular body downward along the cutting line, and then horizontally bent at each tip portion, a holder piece 32-2 formed by cutting out the central portion of the body, and a propelling spring unit 32-3 extended from the body and having a convex portion projecting toward the pickup device near the tip.

On the other hand, on the metal frame 23*c*, three cutout portions 33 are formed in the positions corresponding to the three curved leg portions 32-1 of the propelling leaf spring 32, and a convex portion 34 corresponding to the holder piece 32-2 of the propelling leaf spring 32 is formed substantially at the center surrounded by the three cutout portions 33.

When the body of the propelling leaf spring 32 is pushed into the metal frame 23*c* with the thee curved leg portions 32-1 of the propelling leaf spring 32 engaged with the three cutout portions 33 of the metal frame 23*c*, the tip of the holder piece 32-2 is engaged in the circumferential side of the convex portion 34, the propelling leaf spring 32 is positioned outside the metal frame 23*c*, the convex portion 31 of the zoom shaft cam 25 is pressed with propelling force by the convex portion at the tip of the propelling spring unit 32-3, thereby performing the positioning.

Thus, the zoom shaft cam 25 is arranged near the prism L1 held by the first fixed lens frame unit 15 with the central axis arranged in the direction of the length of the main fixed lens frame 22, that is, parallel to the second optical axis O2, and is arranged with at least a part in the axis direction placed adjacent to the side of the prism L1.

Then, a zoom motor unit 35 is arranged in the space of the substantially triangular pillar formed by the slope of the first fixed lens frame unit 15 holding the reverse side of the reflective face of the prism L1 and the metal frame 23*c*, and a reduction gear train 36 is engaged with the gear 27 of the zoom shaft cam 25. The zoom motor unit 35 is fixed to the first fixed lens frame unit 15 by the two holders (refer to FIG. 4) of a gear shaft fixing part 37 and a holding plate fixing part 38 screwed on a positioning hole 39 and a holding hole 41 formed in the first fixed lens frame unit 15. The engagement between the reduction gear train 36 and the gear 27 of the zoom shaft cam 25 is described later in detail.

After the process above, an aperture/shutter unit 42 is assembled to the main fixed lens frame 22. The aperture/shutter unit 42 (see FIG. 2) comprises an aperture/shutter part 43 having an aperture which controls the amount of passing light of reflection light forming the second optical axis O2, and a shutter, and rotary solenoids 44 and 45 which respectively drive the aperture and the shutter of the aperture/shutter part 43 in a mechanical manner.

The aperture/shutter part 43 is arranged in the diaphragm position (shutter position) 21 shown in FIG. 2, and the two rotary solenoids 44 and 45 are arranged below the zoom shaft cam 25. The aperture/shutter unit 42 is described later in detail.

Furthermore, an ultrasonic linear motor 46 and a magnetic sensor unit 47 for movably driving the third movable lens frame 19 are arranged below the aperture/shutter unit 42 as overlapping each other in the short side direction of the main fixed lens frame 22.

Thus, the ultrasonic linear motor 46 is arranged on the taking side (in front of the body, that is, the side from which FIG. 1B is obtained) in the position in a direct extension of the axis of the zoom shaft cam 25.

The magnetic sensor unit 47 (refer to FIG. 4) comprises a magnetic sensor holder 48, a magnetic sensor 49, a magnetic scale 51, and a propelling spring 52.

The above-mentioned ultrasonic linear motor 46 and the magnetic sensor unit 47 are described later in detail.

Thus, after each of the above-mentioned members is arranged, the first movable lens frame 17, the second movable lens frame 18, and the third movable lens frame 19 to which the movable lens units (9, 11, and 12, but omitted in FIGS. 3 and 4) shown in FIG. 2 are fixed using an adhesive agent are mounted.

Then, for the circumferences of the lens holders of the first, second, and third movable lens frames 17, 18, and 19, the surface before and after (relative to the lens-implement 7 shown in FIG. 1B) the digital camera 1 about the second optical axis O2 is formed flat, thereby realizing a slim movable lens frame incorporated into the lens-implement 7.

Furthermore, for a further reduction in the thickness of the frame structures at the rear portion (the upper left portion shown in FIG. 3, the lower right portion shown in FIG. 4) of the lens frame holding a lens of the lens the second and third movable lens frames 18 and 19 corresponding to the flat circumferential side portion at the rear of the lens are cut out to form the cutout portion 18-1, 19-1 (refer to FIGS. 2, 3, and 4), and a flat circumferential side portion of the rear of the lens is exposed.

The first movable lens frame 17, the second movable lens frame 18, and the third movable lens frame 19 (refer to FIG. 4) are respectively provided with a bearings 53 (53-1, 53-2, and 53-3), and the bearings 53 are provided with guide holes 54 (54-1, 54-2, and 54-3).

Additionally, the first movable lens frame 17, the second movable lens frame 18, and the third movable lens frame 19 are provided with U-shaped cutout portions 55 (55-1, 55-2, and 55-3) at the tip opposite the above-mentioned bearing 53.

Furthermore, a light reflective member 59 is attached and arranged at a step portion 58 formed in boundary between a front end outer surface 56 opposite the rear end portion having the bearing 53 of the first movable lens frame 17 and the U-shaped cutout portion 55 (refer to FIG. 3) and a side portion 57 on which the bearing 53 is arranged.

Furthermore, cam followers 61 (61-1, 61-2) are respectively formed at the portion provided as incorporated into the bearing 53-1 of the first movable lens frame 17 and in a portion which is provided to extend integrally with the bearing 53-2 of the second movable lens frame 18.

In addition, a light reflective member 62 is attached to the side horizontally extending on the bearing 53-3 of the third movable lens frame 19.

Convex portions 63 (63-2, 63-3) for reinforcement as explained by referring to FIG. 2 are formed in the second movable lens frame 18 and the third movable lens frame 19 on the front end outer surface opposite the rear end portion having the bearing 53 and the U-shaped cutout portion 55.

The convex portion 63 is provided to reinforce the strength of the lens frame from which the frame structure is cut out to make a slim implement as described above.

A first guide shaft 65 both ends of which are supported by guide shaft support holes 64 (64-1, 64-2) formed at the corner closest to the side of the aperture and the main surface of the aperture of the first fixed lens frame unit 15 and the second fixed lens frame unit 16 respectively is inserted into guide holes 54 of the three movable lens frames.

Thus, the first, second, and third movable lens frames 17, 18, and 19 (that is, the three movable lens units 9, 11, and 12) are supported as movable in the direction of the optical axis O2.

Since the guide shaft support hole 64 (64-1, 64-2) supporting the first guide shaft 65 are formed at the corner closest to the side and the main surface of the aperture, the first guide shaft 65 is arranged at the closest possible outermost portion where the open side and the open main surface cross, inner main body of the lens implement 7 formed by main fixed lens frame 22. Thus, by the first guide shaft 65 arranged in the closest possible outermost position supporting the bearing 53, the three movable lens frames can be arranged in the narrow rectangular parallelepiped space in the body of the implement without waste.

When the first guide shaft 65 is inserted, a compression spring 66 having propelling force is externally engaged in the first guide shaft 65, and intervenes between the bearing 53-1 of the first movable lens frame 17 and the bearing 53-2 of the second movable lens frame 18.

Before the assembly of the above-mentioned three movable lens frames, the second guide shaft 68, both ends of which are supported by the other two guide shafts support holes 67 (refer to FIG. 4) formed in the position closest to the closed side and the main surface of the aperture configured in the metal frame 23b of the first fixed lens frame unit 15 and the second fixed lens frame unit 16, is arranged.

The second guide shaft 68 is positioned on the emission side of the prism L1 held in the first fixed lens frame unit 15. In detail, as shown in FIG. 5(*b*), it is arranged in the above-mentioned position by the guide shaft support hole 67 formed in the projection range in the emission side direction of the prism L1, out of the effective optical range of the ray flux on the emission side, and near the effective optical range.

In the assembly of the above-mentioned three movable lens frames, after the U-shaped cutout portions 55 (55-1, 55-2, and 55-3) are supported as engaged in the second guide shaft 68 from the side and as freely sliding on it, each movable lens frame is rotated inward along on the second guide shaft 68, and the cam follower 61 arranged in the first movable lens frame 17 and the second movable lens frame 18 is caught in the cam groove of the zoom shaft cam 25 as freely sliding and making intrusion.

That is, the cams (the cam grooves with which the cam followers 61-1 and 61-2 are engaged) corresponding to a plurality of lens frames (the first movable lens frame 17 and the second movable lens frame 18 in this example) are formed in the zoom shaft cam 25.

Simultaneously, the front end outer surface 56 (refer to FIG. 3) of the first movable lens frame 17, which forms one main surface of the metal frame 23a, is arranged on the reverse of the metal frame 23a, and the reinforcing convex portions 63 formed on the front end outer surfaces of the second movable lens frame 18 and the third movable lens frame 19 are engaged in an aperture 69 formed in the metal frame 23a.

The aperture 69 is formed as a above and below long aperture depending on the travel stroke of the movable lens to avoid the interference with the movable lens (refer to the lenses L5 through L8 shown in FIG. 2) which travels as the second movable lens frame 18 and the third movable lens frame 19, that is, to avoid the interference with the travel of the convex portion 63.

Then, the first guide shaft 65 is inserted into the guide hole 54 of the bearing 53 of each movable lens frame and the guide shaft support hole 64 at both end portions. Thus, the two guide shafts (65 and 68) are adjacent to the zoom shaft cam 25, and is arranged parallel to the axis of the zoom shaft cam 25.

Thus, since the axial members are arranged adjacent and parallel to each other, the implement can be downsized.

By the support of these two guide shafts, the three movable lens frames (17, 18, and 19) are set as sliding vertically (in the direction of the optical axis O2), one guide shaft stops the rotation around the other guide shaft, the position normal to the optical axis O2 is set in the main fixed lens frame 22.

By the compression spring 66 externally engaged and intervening the first guide shaft 65 between the bearing 53-1 of the first movable lens frame 17 and the bearing 53-2 of the second movable lens frame 18, the first movable lens frame 17 and the second movable lens frame 18 are propelled toward the opposite directions.

Thus, the cam followers 61-1 and 61-2 engaged with the cam groove of the zoom shaft cam 25 are pushed toward the opposite sides of the groove structure of the cam groove. Therefore, the idle generated between the cam groove and the cam follower when the zoom shaft cam 25 is driven for rotation can be removed. Thus, the displacement between the upward travel and the downward travel can be correctly controlled.

In the above-mentioned arrangement, the first guide shaft 65 is arranged adjacent parallel to the zoom shaft cam 25.

Then, the image pickup device 14 also shown in FIG. 2 is attached below the bottom of the second fixed lens frame unit 16. A photosensor attachment hole 71 is provided in the position corresponding to the light reflective member 59 attached to the first movable lens frame 17 on the first fixed lens frame unit 15 located on the same plane as the metal frame 23a, and a photosensor 72 is arranged into the photosensor attachment hole 71.

The photosensor 72 detects the initial position of the first movable lens frame. The transfer distance of the first movable lens frame from the detected initial position can be determined by detecting the transfer position by the control device (not shown in the attached drawings) counting the number of steps of the zoom motor driven by the zoom motor unit 35.

Another photosensor 73 is arranged in the position corresponding to the light reflective member 62 attached to the third movable lens frame 19 on the side opposite the open side of the second fixed lens frame unit 16. The photosensor 73 detects the initial position of the third movable lens frame 19 by detecting the reflected light from the light reflective member 62 attached to the third movable lens frame 19.

FIG. 5A is an enlarged perspective view of the construction of the first fixed lens frame unit 15 holding the first fixed lens unit 8 shown in FIG. 12 from a different direction. FIG. 5B shows the view from the direction of the lens L2 (in the direction of the optical axis O2). The above-mentioned configuration includes the reference numerals assigned to the components commonly shown in FIGS. 1 through 4.

As shown in FIG. 5A, the first fixed lens frame unit 15 is provided with the bearing engagement hole 28 into which the small diameter part 26a of the zoom shaft cam 25 is inserted, and a bearing hole 74 which supports the other small diameter part 26b of the zoom shaft cam 25 but is hidden and cannot be seen in FIG. 3.

FIGS. 5A and 5B show the first fixed lens frame unit 15 incorporated into the metal frame, but the metal frame is omitted in the figures. The portions of the metal frames 23a and 23b shown in FIGS. 3 and 4 are located on the top surface and the right side in FIG. 5B.

To the first fixed lens frame unit 15, the first fixed lens unit 8, the zoom shaft cam 25 for transferring the first and second movable lens frames 17 and 18 with predetermined physical relationship along the second optical axis O2 directed by the prism L1, the zoom motor unit 35 for rotating the zoom shaft cam 25 on the rotation axis, etc. are attached.

First, in the first fixed lens unit 8 shown in FIG. 2 held by the first fixed lens frame unit 15, the prism L1 is located in the place not interfering with the effective optical range of the reflective face of the prism by a convex part 75 formed on left and right parts inside the first fixed lens frame 15, as described later in detail as shown in FIG. 6A, and fixed by an adhesive filled in the space formed by the adhesive catch unit 24 in the portion not interfering with the effective optical range of a emission side of prism to the first fixed lens frame unit 15.

The other lens L2 contained in the first fixed lens unit 8 forms a smooth circumferential side 76 with the upper and lower circumferential sides cut out along the directed optical axis O2 to make a slim lens-implement 7. As a result, the lens L2 forms an ellipse 77 In addition to the form of the ellipse 77, in the portion holding the lens L2 of the first fixed lens frame unit 15, the portion corresponding to at least one (lower portion in the drawing) of the smooth circumferential sides 76 of the cutout portions of the lens L2 formed in the ellipse 77 forms a cutout portion 78 on the plane parallel to the optical axis O2. Therefore, the lens-implement 7 can be further slim.

The circumferential portion excluding the smooth circumferential side 76 of the lens L2 contained in the first fixed lens unit 8 is held by four convex portions 79 (79-1, 79-2, 79-3, and 79-4) provided in the first fixed lens frame unit 15.

As shown in FIG. 5B (refer to FIG. 5A), the guide shaft support hole 67 provided in the first fixed lens frame unit 15 to hold the second guide shaft 68 is formed in the place closest to the closed side and the open main surface (lower side in FIGS. 5A and 5B) configured by the metal frame 23b together with the other guide shaft support hole 67 not shown in FIG. 5B as described above.

Thus, as shown in FIG. 5A, the guide shaft support hole 67 is positioned at the emission side (also the lens L2 side) of the prism L1 held by the first fixed lens frame unit 15, and is formed as shown in FIG. 5B in the projection range L1' in the emission side direction of the outline of the prism L1, out of the effective optical range of the emission side ray flux (same range as the front side of the elliptical lens L2), and near the effective optical range.

Therefore, the second guide shaft 68 supported by the two opposite guide shaft support holes 67 are arranged in the similar positions as described above.

The guide shaft support hole 64-1 provided in the first fixed lens frame unit 15 to support the first guide shaft 65 shown in FIGS. 3 and 4 is, as above mentioned, provided at the corner closest to the aperture side opposite the metal frame 23b and the aperture main surface opposite the metal frame 23a together with the other guide shaft support hole 64-2 provided in the second fixed lens frame unit 16 not shown in FIG. 5B.

Therefore, the first guide shaft 65 supported by the two opposite guide shaft support holes 64-1 and 64-2 is arranged in the similar position as described above.

As a result, in other words, the cross section (23a and 23b) configuring an L-shaped form of the metal frame 23 forming part of the main fixed lens frame 22 is, as shown in FIG. 5B, provided on the opposite side of the first guide shaft 65 over the plane k or p containing the optical axis O2 directed by the prism L1.

FIG. 6A is an exploded perspective view of the material incorporated into the first fixed lens frame unit 15. FIG. 6B is a side view of the zoom motor unit 35 incorporated into the first fixed lens frame unit.

FIG. 6A shows the configuration in the first fixed lens frame unit 15 such as the adhesive catch unit 24, the convex portion 75 and etc. for the prism L1, which are composition inside the opposite side not shown shadily by the prism L1 in FIG. 5. Furthermore, by removing the lens L2, the adhesive catch unit 24, the four convex portions 79 and the cutout portion 78 for the lens L2. Although they are not shown exactly in FIG. 5.

FIG. 6B shows a side view of the zoom motor unit 35 and a side sectional view of the first fixed lens frame unit 15.

As shown in FIG. 6A, the first fixed lens frame unit 15 has a slope portion 81 along a reflective surface of the prism L1, and the slope portion 81 is provided with a small rectangular convex portion 82 in the position out of the effective optical range of the reflective surface of the prism L1 corresponding to the lower end portion of the convex portion 75 for the prism L1.

To store the zoom motor unit 35 shown in FIG. 6B in the space at the back of the slope portion 81, and a gap as originally idle space at the back of the prism without waste, three cutout groove holes 83 are formed as cut out for free space of the upper corner of the zoom motor unit 35.

To avoid the entry of harmful light from the back through the cutout groove hole 83 to the reflective surface of the prism L1, there is a visor 84 between the surface of the slope portion 81 and the reflective surface (reverse side) of the prism L1. On both ends of the visor 84, a cutout portion 85 for engagement with the convex portion 82 is formed. The cutout portion 85 forms free space for the convex portion 82, and has the function of positioning the visor 84.

A motor 86 of the zoom motor unit 35 is configured by a stepping motor. As shown in FIG. 6B, the motor 86 is close to the slope portion 81, and arranged opposite the prism L1 (free space at the back) about the slope portion 81. An output axis 87 is arranged parallel to the second optical axis O2.

Figure 7:
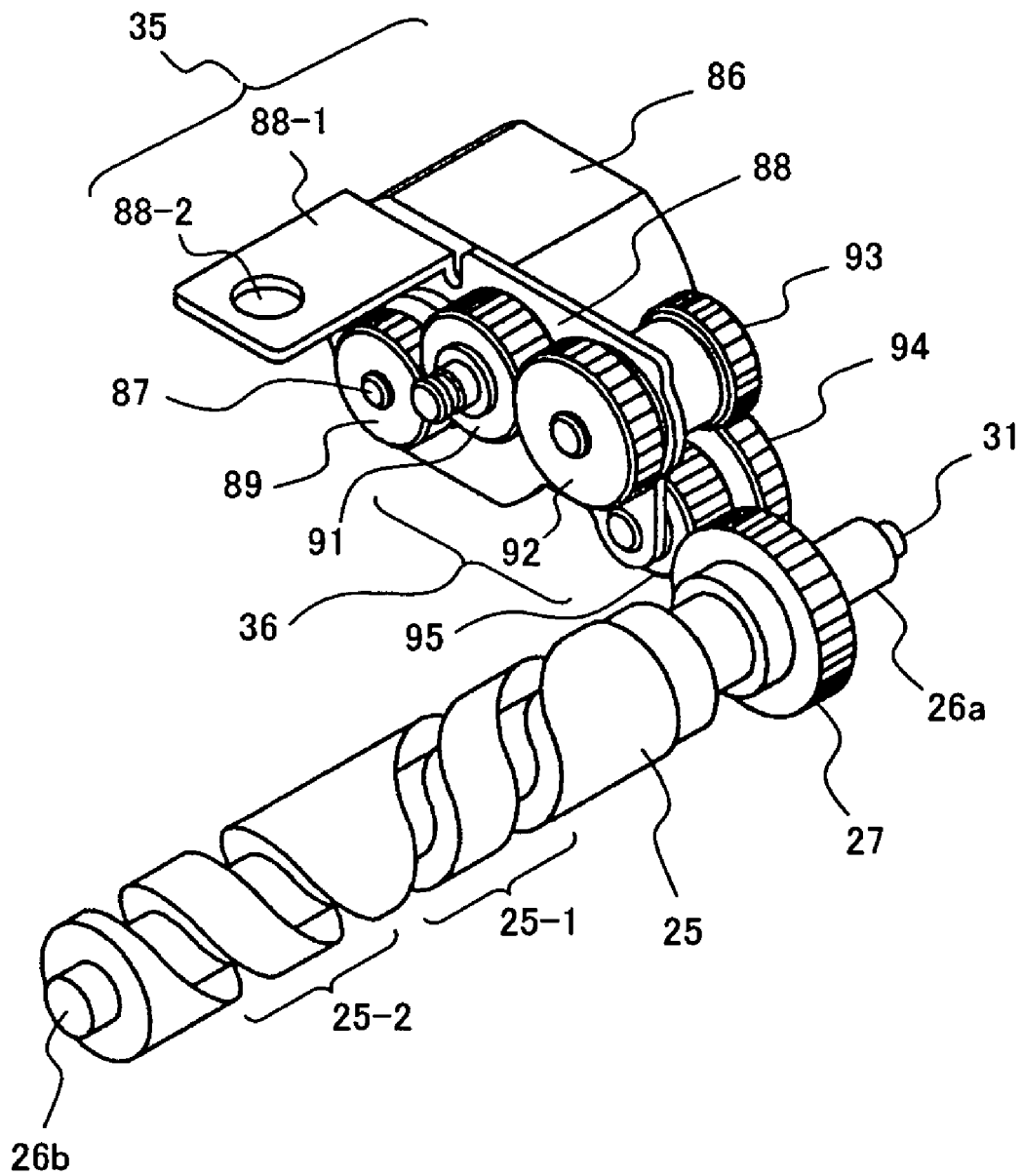
FIG. 7 shows the configuration of the zoom motor unit and the engagement of the unit with the shaft cam.

FIG. 7 shows the configuration of the zoom motor unit 35, and the engagement between the zoom motor unit 35 and the zoom shaft cam 25. FIG. 7 shows the objects shown in FIG. 6 as shown from the other side below. That is, it is a perspective view of the zoom motor unit 35 and the zoom shaft cam 25 taken out and set upside down.

As shown in FIG. 7, the zoom motor unit 35 is attached with a base plate 88 mounted on the side for which the output axis 87 of the motor 86 is provided. A plurality of gears are mounted on both surfaces and form the gear train 36 for transmitting the rotation of the motor 86 to the zoom shaft cam 25.

The gear train 36 comprises a drive gear 89 attached to the output axis 87 of the motor 86, an idle gear 91 directly engaged with the drive gear 89, a large diameter gear 92 of the first reduction gear for engagement with the idle gear 91, a small diameter gear 93 configuring the first reduction gear with the large diameter gear 92, a large diameter gear 94 of the second reduction gear for engagement with the small diameter gear 93, and a small diameter gear 95 composing the second reduction gear with the large diameter gear 94, for direct engagement with the gear 27 of the zoom shaft cam 25.

The zoom motor unit 35 is fixed with the rotation axis of the second reduction gear having the small diameter gear 95 for engagement with the gear 27 of the zoom shaft cam 25 incorporated into the positioning hole provided in the first fixed lens frame unit 15 and screwed to the first fixed lens frame unit 15 through an attachment hole 88-2 of an attachment unit 88-1 set after directed approximately normal to the base plate 88.

In the zoom motor unit 35, the drive gear 89 of the output axis 87, the idle gear 91, and the large diameter gear 92 of the first reduction gear are arranged on the same plane of the base plate 88, and the small diameter gear 93 of the first reduction gear and the large diameter gear 94 and the small diameter gear 95 of the second reduction gear are arranged on the opposite surface of the idle gear 91 of the base plate 88.

That is, the gear (small diameter gear 95 of the second reduction gear) directly engaged with (the gear 27 of) the zoom shaft cam 25 in the gear train 36 comprising a plurality of gears incorporated into the base plate 88 is engaged with the base plate opposite the base plate of the gear (idle gear 91) directly engaged with the gear (drive gear 89) of the output axis 87 in the gear train 36.

Thus, a plurality of reduction gears are arranged on both sides of the base plate 88 on which the drive gear 89 of the output axis 87 parallel to the second optical axis O2 is arranged, and at least one set of reduction gears is attached over both sides of the base plate 88, and the small diameter gear 95 of the second reduction gear, which is the gear at the final stage of the gear train 36 on the opposite side of the base plate 88 relating to the drive gear 89, rotates the zoom shaft cam 25 by the engagement of the gear 27 provided on the zoom shaft cam 25 arranged parallel to the second optical axis O2, thereby configuring the gear train 36 for transmission of the drive force to the zoom shaft cam 25 with all spur gears, and shortening the engagement between the zoom motor unit 35 and the zoom shaft cam 25 by at least one gear in the axis direction.

Thus, the configuration of the zoom motor unit 35 can be simplified, and the engagement between them can be realized in the smallest possible space.

By right and reverse turns of the motor 86 in the zoom motor unit 35, the zoom shaft cam 25 is rotated to difference direction at a predetermined angle.

By the engagement of the cam follower 61-1 of the first movable lens frame 17 and the cam follower 61-2 of the second movable lens frame 18 (refer to. FIG. 3) with the first cam groove 25-1 and the second cam groove 25-2 formed to the outer circumference of the zoom shaft cam 25, the first movable lens frame 17 and the second movable lens frame 18 (that is, the first movable lens unit 9 and the second movable lens unit 11) travels with alternate attachment/detachment in the direction of the second optical axis O2 depending on the rotation of the zoom shaft cam 25, thereby performing a reducing/enlarging zoom on a subject image.

Figure 8:
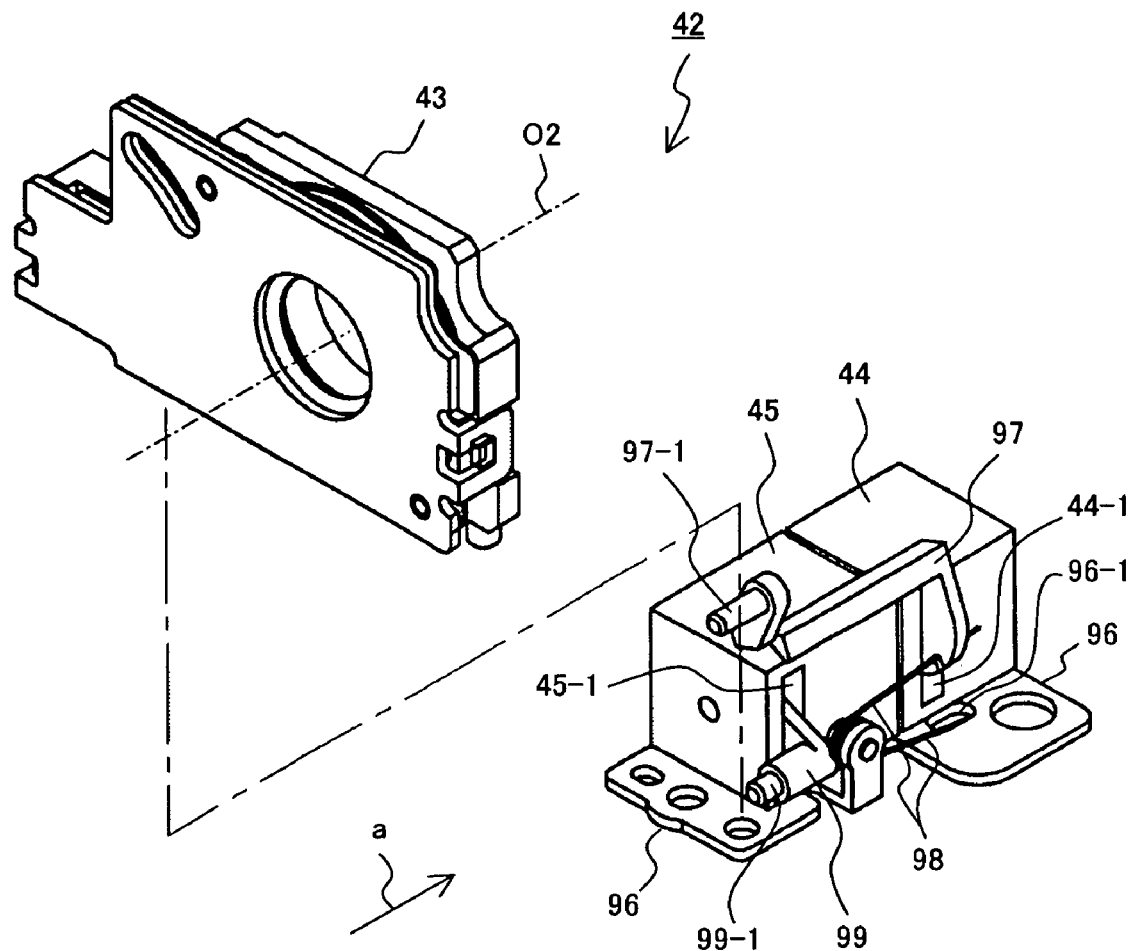
FIG. 8 is a partial exploded perspective view of the diaphragm-shutter unit according to an embodiment of the present invention.

FIG. 8 is a partial exploded and perspective view of the aperture/shutter unit 42. FIG. 8 shows the aperture/shutter unit 42 shown in FIG. 3 viewed from substantially right above. As shown in FIG. 8, the contour of each of the rotary solenoids 44 and 45 of the aperture/shutter unit 42 is substantially square, with one surface (lower surface in FIG. 8) fixed to the base plate 96, and is fixed to the metal frame 23a through the base plate 96.

The rotary solenoid 44 is a drive unit for a diaphragm, provided with a long arm 97 extended from a clearance 44-1 on the side along the side of the other rotary solenoid 45, and the long arm 97 is rotated by a predetermined range of angle.

At the tip of the long arm 97, an engagement portion 97-1 with the diaphragm mechanism of the aperture/shutter part 43 is provided in an extended condition as a pin. A groove is made at the root of the long arm 97 from the clearance 44-1, and one end of a two-legged spring 98 is engaged with the groove, the other end of the two-legged spring 98 is engaged with a spring holder hole 96-1 made in the base plate 96.

The propelling force of the two-legged spring 98 propels the long arm 97 constantly upwards as shown in FIG. 8, that is, counterclockwise as viewed in the direction of the arrow a. The upper position of the long arm 97 as shown in FIG. 8 is the position in which the optical filter (not shown in FIG. 8) in the engaged diaphragm mechanism is saved from the optical path.

The other rotary solenoid 45 is a drive unit for a shutter, and is provided with a short arm 99 mounted as extended outside from a clearance 45-1 of a side of the rotary solenoid 45 parallel to the long arm 97. The short arm 99 is rotated by a predetermined range of angle.

A engagement portion 99-1 is also provided as a pin and engaged with the shutter open/close mechanism of the aperture/shutter part 43. FIG. 8 shows the state in which the short arm 99 stops after rotating downwards, that is, clockwise as viewed in the direction of the arrow a. This is the position in which the shutter of the shutter open/close mechanism engaged with the arm is saved from the optical path.

Then, the aperture/shutter part 43 is attached to the base plate 96. Thus, the drive unit of the diaphragm mechanism of the aperture/shutter part 43 is engaged with the engagement portion 97-1 of the long arm 97, and the drive unit of the shutter open/close mechanism of the aperture/shutter part 43 is engaged with the engagement portion 99-1 of the short arm 99.

When the aperture/shutter unit 42 is incorporated into the metal frame 23a through the base plate 96, the aperture/shutter part 43 is arranged in the diaphragm position 21 shown in FIG. 2 between the first and second movable lens units 9 and 11.

The aperture/shutter unit 42 is not shown in the attached drawings, but comprises a shutter for opening and closing the path of the ray flux traveling through the optical axis O2, the optical filter (ND filter) for controlling the amount of light on the image capturing surface, and the filter open/close mechanism for moving the optical filter forward and backward in the path of the ray flux.

When a voltage is applied to the rotary solenoid 44 through the control device of the circuit substrate 5, the long arm 97 rotates downward against the propelling force of the two-legged spring 98. In cooperation with this, the filter mechanism of the aperture/shutter part 43 allows the optical filter to enter the path of the ray flux, and when the application of the voltage is stopped, the propelling force of the two-legged spring 98 rotates the long arm 97 upward as shown in the figure. In cooperation with this, the filter mechanism allows the optical filter to exit the path of the ray flux.

When the voltage is applied to the rotary solenoid 45 in the closing direction of the shutter through the control device of circuit board 5, the short arm 99 rotates upward. When the application of the voltage is stopped, the status is held. Thus, the shutter open/close mechanism of the aperture/shutter part 43 in cooperation with the short arm 99 closes the shutter and cut off the path of the ray flux, and the status is maintained.

On the other hand, when the voltage is applied to the rotary solenoid 45 in the shutter opening direction through the control device of the circuit substrate 5, the short arm 99 is rotated downward as shown Figure. When the application of the voltage is stopped, the status is held. Thus, the shutter open/close mechanism of the aperture/shutter part 43 in cooperation with the short arm 99 opens the shutter, releases the path of the ray flux, and the status is maintained.

Described below is the ultrasonic linear motor for driving the travel of the third movable lens frame holding the third movable lens unit 12 for focusing.

FIG. 9A is a exploded perspective view of the ultrasonic linear motor for use in the present example. FIG. 9B is a perspective view showing the completion of the assembly. As shown in FIGS. 9A and 9B, an ultrasonic linear motor 100 comprises a rectangular vibrator (ultrasonic vibrator) 101, and a plurality of (two in the example shown in the figure) projection-shaped self-moving contact parts 102 (102-1, 102-2) adhered on the two upper and lower opposite surfaces of the vibrator 101 as incorporated into the vibrator 101 as one unit or separately adhered.

Furthermore, the ultrasonic linear motor 100 comprises two guide shafts 103 (103-1, 103-2) for guiding the movement of the vibrator 101 opposite on the positions upper and lower the vibrator 101 through the self-moving contact part 102, and a support portion 104 which sustains above whole parts positioning them.

On the support portion 104, setting portions 104-2 are mounted on both ends of the base portion 104-1 as incorporated therein. Above the setting portions 104-2, the fixed shaft bearing holes 105 adhered to and for support of the upper guide shaft 103-1 in the two guide shafts 103 are formed. Below the structure, shaft bearing long holes 106 are formed for support of the lower guide shaft 103-2 as allowing oscillation.

Outside the base portion in the vicinity of both ends of the base portion 104-1, convex portions 107 are provided in the positions corresponding to the lower guide shaft 103-2 inserted into the shaft bearing long holes 106. The convex portions 107 are hollow as viewed from above, which is not clearly shown in the attached drawings though. A coil spring 108 is held inside the hollow portion.

At the outer bottom portion near both ends the base portion 104-1 of the support portion 104, a convex portion 107 at corresponding location to a lower guide shaft 103-2 inserted into the shaft bearing long hole 106 is respectively provided, and the convex portion 107 is not clearly seen in the figure, but it is hollow when viewed from above, and a coil spring 108 is held in the hollow portion.

Then, the upper end portion of the coil spring 108 projecting exterior upwards from inner hollow portion propels the lower guide shaft 103-2 upwards in the vicinity of both end portions of the lower guide shaft 103-2. Thus, the lower guide shaft 103-2 is held by the shaft bearing long hole 106 as vertically moving by the vibrating movement, which is described after, of the vibrator 101 held tight by the upper guide shaft 103-1 and the lower guide shaft 103-2 and the propelling force of the coil spring 108.

To prevent the loss or omission of the freely moving lower guide shaft 103-2 from the long bearing hole 106, a antiskid pin 109 is arranged as touching both end portions of the lower guide shaft 103-2 inserted to the shaft bearing long hole 106, and the antiskid pin 109 is adhered into a pin fixing groove 111 formed on the outside of the aperture of the shaft bearing long hole 106.

The vibrator 101 moves forward and backward between the setting portion 104-2 on both ends in the direction parallel to the guide shafts 103-1 and 103-2 indicated by the arrow b in both directions as shown in FIG. 9B by the specific vibration movement described later and the effect of the self-moving contact part 102 the two guide shafts 103-1 and 103-2.

The above-mentioned self-moving contact part 102 has a cutout portion having a curved surface at the curvature substantially the same as the radius of the first and second guide shaft 103 at the contact surface of the first and second guide shaft 103. Thus, the self-moving contact part 102 is regulated to freely move in the direction along the first and second guide shaft 103.

The ultrasonic linear motor 100 according to the present embodiment shown in FIG. 9B is configured such that the vibrator 101 itself can be freely moved. The configuration of the vibrator 101 is briefly explained below.

FIG. 10 shows the wiring of an electrode to the vibrator 101 not shown in FIGS. 9A and 9B. In FIG. 10, the direction of the vibrator 101 is opposite to that shown in FIGS. 9A and 9B.

The inside of the vibrator 101 shown in FIG. 10 is not specifically shown, but two piezoelectric multilayer units 112 (112A, 112B) like square pillar are arranged side by side, thus forming the parallelepiped vibrator 101.

The configuration of the piezoelectric multilayer unit 112 is not shown in detail, but it is multilayer unit layered with a plurality of a thin rectangular piezoelectric sheet, made of, for example, PZT (titanium zirconate lead) etc. treated by electrode processing, and is layered with two non-electrode processed insulator layers on top and end as is held tight.

The outermost insulator layers formed in the direction of the piezoelectric layers form opposed faces of the vibrator 101 held tight by the two guide shafts 103 through the self-moving contact parts 102 as shown in FIG. 9, namely, upper and lower faces 101-1 and 101-2 of the vibrator 101 as shown in FIG. 10.

The other side of the piezoelectric multilayer unit 112, that is, the face parallel to the two guide shafts 103 shown in FIG. 9B of the vibrator 101 not facing the guide shaft 103, and the face normal to the direction of the two guide shafts 103 are also covered with appropriate insulator layers.

Then, the vibrator 101 is provided with four external electrode terminals A+, A−, B+, B− for the one side 101-3 in the two sides not facing but parallel to the two guide shafts 103 as shown in FIG. 10. These external electrode terminal A+, A−, B+, B− are connected to the inner electrode of each piezoelectric layer on which the inner electrode process is performed. The electrode terminals A+ and A− are configured as A-phase electrodes, and the electrode terminals B+ and B− are configured as B-phase electrodes.

The ultrasonic elliptic vibration described later is generated in the vibrator 101 by the drive voltage applied from the control device to the external electrode terminals A+, A−, B+, and B−.

The self-moving contact part 102 formed as projections on the layer directional faces of the piezoelectric multilayer unit 112, that is, prospectively on two portions in the two faces of the face 101-1 and the face 101-2 formed by the above-mentioned insulator layers of the vibrator 101, is prospectively provided in an arbitrary position in which the highest level output feature of the vibrator 101 can be obtained, that is, in the position in which, as described after, the highest level of ultrasonic elliptic vibration of the vibrator 101 is performed.

Furthermore, in one side 101-3 of the vibrator 101, in the central portion of the vibrator 101, that is, in the vicinity (in this embodiment, the portion is referred to as a "node") of the stationary point in the primary vertical vibration and the secondary curving vibration, described later, as the vibration mode, the pin member 113 for bringing out output power of the vibrator 101 is fixed to the side 101-3 as substantially normal.

Thus, as described later, when the traveling force is transmitted from the vibrator 101 to the third movable lens frame 19, only the traveling force (self-moving force) can be transmitted to the third movable lens frame 19 without transmitting the vibration of the vibrator 101 to the third movable lens frame 19 without permission.

The pin member 113 for the retrieval of the traveling output can be any hollow or rigid member having a section of circle, square or any other optional shapes.

Thus, the characteristic of the shape and the material of the transmission member of the drive force for traveling the lens frame are simple construction, the production cost can be reduced, and the assemble work is very easy.

FIGS. 11A and 11B are perspective views for explanation of the ultrasonic elliptic vibration of the vibrator 101. First, when an alternating voltage about the frequency of 160 kHz is applied with the same phases to the A-phase and B-phase electrode of the vibrator 101 shown in FIG. 10, the primary vertical vibration is pumped to the vibrator 101. When an alternating voltage about the frequency of 160 kHz is applied with the opposite phases to the A- and B-phase electrodes, the secondary curbing vibration is pumped the vibrator 101.

When these vibrations are analyzed by a computer using a finite-element method, the resonant vertical vibration posture as shown in FIG. 11A and the resonant curving vibration posture as shown in FIG. 11B are anticipated. Then, the result of the ultrasonic vibration measurement has proved the anticipation.

The elliptic vibration composed from these vertical vibration and the curving vibration of the vibrator 101 works on the two guide shafts 103 through the four self-moving contact parts 102, and, as the reaction of the work, the vibrator 101 moves forward and backward between the two setting portions 104-2 of the support portion 104 along the two guide shafts 103. This is the operation principle of the ultrasonic linear motor according to the present invention.

In the ultrasonic linear motor 100 shown in FIGS. 9A and 9B, the lower guide shaft 103-2 in the two upper and lower guide shaft 103 enclosing the vibrator 101 vibrating as shown in FIGS. 11A and 11B through the self-moving contact part 102 is supported by the shaft long bearing hole 106 of the support portion 104 but is not fixed, and the displacement of the both ends is suppressed by the shaft long bearing hole 106 in horizontal direction, but the vertical movement is propped up by the coil spring 108, and can be moved within the range of the shaft long bearing hole 106.

Therefore, especially when the vibrator 101 is close to one of the setting portion 104-2 between the upper and lower guide shaft 103, the upper and lower guide shaft 103 are not relatively parallel (the sides where the vibrator 101 is not located are closer), and some self-moving contact parts 102 do not contact the guide shaft 103.

However, although a part of the self-moving contact part 102 can be separate from the guide shaft 103, it is not a definite problem for the moving operation of the vibrator 101. For example, the four self-moving contact parts 102 (refer to FIG. 9B) contact the two guide shafts 103 between the two support portions 104, that is, at the center of the moving operation of the vibrator 101, but when the vibrator 101 is moved to the leftmost position, the lower left self-moving contact part 102-2 is somewhat upheld from the lower guide shaft 103-2, and when the vibrator 101 is moved to the rightmost position, the lower right self-moving contact part 102-2 is somewhat upheld from the lower guide shaft 103-2. In this case, the self-moving contact part 102-2 which is not upheld (lower right when it is located in the leftmost position) contacts the lower guide shaft 103-2, performs a elliptic vibration, and becomes the source of the traveling force of the vibrator 101. Therefore, the self-moving contact part 102 can obtain the traveling force of the vibrator 101 if any two or three units contact the upper and lower guide shaft 103.

FIG. 12A is a perspective view for explanation of the coupling method between the ultrasonic linear motor 100 and the third movable lens frame 19. FIG. 12B is a perspective view showing the retrieved leaf spring used in the coupling. FIG. 12C is a perspective view of the retrieved coupling portion only.

FIG. 12A is a perspective view of the ultrasonic linear motor 100 and the third movable lens frame 19 diagonally above from the left of FIG. 4. In the explanation below by referring to FIGS. 12A, 12B, and 12C, the direction, that is, up and down, left and right, forward and backward, is based on FIGS. 12A, 12B, and 12C, but not FIG. 4. FIG. 12A shows the pin member 113 for retrieval of the traveling output fixed as inserted inside from the center of the pin fixed face at the upper left of the vibrator 101 for understanding easily.

As shown in FIG. 12A, the third movable lens frame 19 comprises the lens frame body 114 for holding the third movable lens unit 12, the bearing 53-3, and an engagement projection unit 115 projecting downward from the bearing 53-3. Around the center of the engagement projection unit 115, a long hole 116 is set parallel to the second optical axis O2 in the traveling direction of the lens frame body 114.

The long hole 116 is engaged with a leaf spring 117 for propelling the pin member 113 for retrieval of traveling output to the contact portion (long hole 116 of the engagement projection unit 115) with the third movable lens frame 19.

The leaf spring 117 comprises a flat body unit 117-1, an engagement unit 117-2 directed in two directions from below to the front and upward of the body unit 117-1, and a propelling unit 117-3 directed from left of the body unit 117-1 to the front.

The engagement unit 117-2 of the leaf spring 117 is engaged with the engagement projection unit 115 by enclosing the lower end portion of the engagement projection unit 115 in which the long hole 116 of the third movable lens frame 19 is formed wraparound from the back. Thus, the body unit 117-1 of the leaf spring 117 tightly contacts the aperture of the long hole 116, and the propelling unit 117-3 is inserted into a predetermined position in the long hole 116 from the farther side.

Between the propelling unit 117-3 and the left end portion of the long hole 116, there is space enough for the pin member 113 for retrieval of traveling output to be inserted.

Between the farther surface of the third movable lens frame 19 and the lens frame body 114 and the surface of front side of the engagement projection unit 115, there is space enough for the ultrasonic linear motor 100 to be arranged. When the ultrasonic linear motor 100 is arranged in the space, the pin member 113 for retrieval of the traveling output is inserted into the space formed between the propelling unit 117-3 and left end of the long hole 116 as shown in FIG. 12C.

The engagement prohibits the pin member 113 for retrieval of the traveling output from moving to the direction of the second optical axis O2 in the long hole 116, but allows it for idle space in moving ups and downs.

The idle space allows the displacement, etc. of the attachment positions between the vibrator 101 and the two guide shafts 103 to be absorbed.

Thus, the pin member 113 for retrieval of the traveling output correctly transmits the movement and the force of the vibrator 101 in the direction of the second optical axis O2 to the third movable lens frame 19, and the up and down movement by the elliptic vibration of the vibrator 101 is absorbed by the up and down movement in the long hole 116, and is not transmitted to the third movable lens frame 19. Therefore, there is no possibility of the displacement of a subject image at focusing.

Thus, according to the present embodiment, when the vibrator 101 is coupled with the third movable lens frame 19, one point is fixed to the vibrator 101, and the other point only touches the touch point (the long hole 116 of the engagement projection unit 115) to the third movable lens frame 19 by the propelling force of the leaf spring 117, thereby forming the coupling status by the pin member 113 for retrieval of the traveling output. Thus, the traveling force (drive force) of the vibrator 101 is transmitted to the travel of the third movable lens frame 19.

According to the present embodiment, a pin of a pillar member is set as a running transmission member at the side center of the vibrator for making vertical vibration and elliptic vibration. However, the application is not limited to this, but other vibration mode or the composite of other vibration modes are used for a vibrator. In this case, the vibration of a vibrator can be transmitted to a lens frame of traveling (running) power without interference with the vibration of the vibrator so far as a pin is arranged at a common node for the vibration mode or a point where the vibration is minimized.

Figures 13A, 13B:
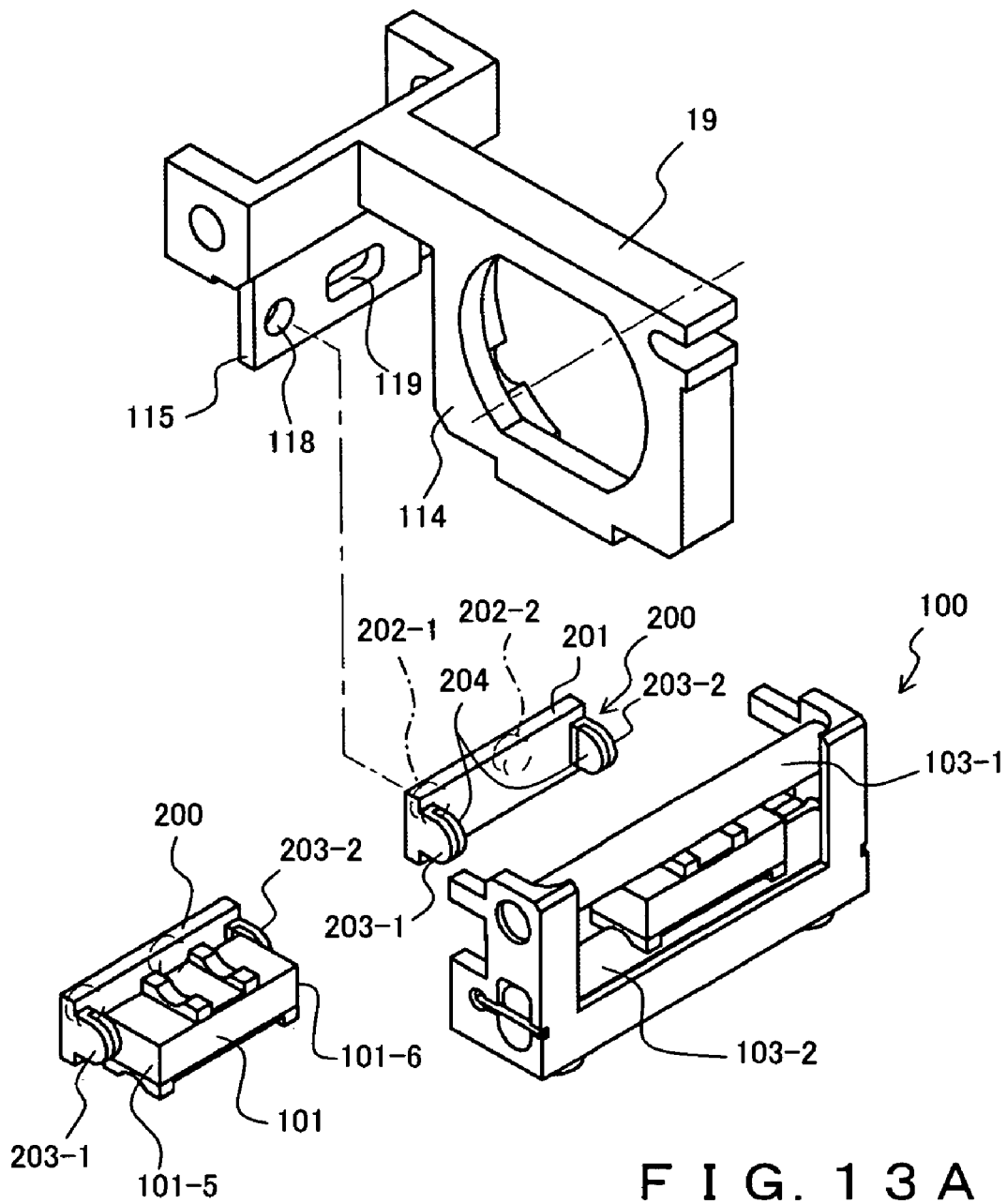
FIGS. 13A and 13B are perspective views showing another method of connecting the ultrasonic linear motor with the third movable lens frame.

FIGS. 13A and 13B are the perspective views showing the other method of coupling the ultrasonic linear motor 100 (the vibrator 110) and the third movable lens frame. As shown in FIG. 13A, a round hole 118 and a long hole 119 are formed side by side in the direction of the second optical axis O2 at the catching raised portion 115 of the third movable lens frame 19.

In the present embodiment, the single rigid holding member 200 replaces the pin member 113 for retrieval of the traveling output and the leaf spring 117. The rigid holding member 200 comprises a base portion 201 of a rectangular plate, a convex portion 202 (202-1, 202-2) formed in two positions on the back of the base portion 201, a holding portion 203 (203-1, 203-2) provided from both end portions in longitudinal direction from side to side of the base portion 201 approximately on the square in the short. Inside the holding portion 203, for example, a elastic member 204 made of silicon rubber, etc. is adhered.

The convex portion 202-1 is positioned by holding with the round hole 118 of the catching raised portion 115, and the convex portion 202-2 is engaging with the long hole 119 and is suppressed the rotation, thereby the rigid holding member 200 is fixed by adhesion.

When an ultrasonic linear motor 100 is arranged in the space formed between the side beyond the main lens frame 114 of the third movable lens frame 19 and this side of the catching raised portion 115, the above-mentioned rigid holding member 200 holds the two contour planes 101-5 and 101-6 normal to the running direction (traveling direction) of the vibrator 101 as shown in FIG. 13B using the holding portion 203 through the elastic member 204 adhered to the inside, thereby coupling the vibrator 101 to the third movable lens frame 19.

Thus, by the rigid holding member 200 holding the vibrator 101 through the elastic member 204, the displacement, etc. made between the above-mentioned vibrator 101 and the two guide shafts 103 during the attachment can be absorbed, thereby preventing excess external force from being applied to the vibration characteristic of the vibrator 101.

The holding portion 203 of the rigid holding member 200 enters the space between the two guide shafts 103-1 and 103-2 arranged parallel to the ultrasonic linear motor 100, and encloses the vibrator 101.

Thus, with the configuration shown in FIG. 13, the self-moving force (traveling force) of the vibrator 101 of the ultrasonic linear motor 100 can be transmitted to the third movable lens frame 19. In addition, in FIG. 13, the rigid holding member 200 is provided separate from the third movable lens frame 19. However, the present invention is not limited to this application, but the third movable lens frame 19 can be incorporated into the rigid holding member 200.

FIGS. 14A and 14B are perspective views showing another method of coupling (the vibrator 101 of) the ultrasonic linear motor 100 with the third movable lens frame 19.

The configuration of the engagement projection unit 115 of the third movable lens frame 19 shown in FIG. 14A is the same as shown in FIG. 13A. In the present embodiment, the rigid holding member 200 is replaced with an elastic holding member 200'.

The elastic holding member 200' is entirely formed by an elastic member such as a basic portion 201', a convex portion 202' (202'-1 202'-2), an holding portion 203' (203'-1, 203'-2), etc. Therefore, it is not necessary to adhere the elastic member 204 in the holding portion 203' (203'-1, 203'-2) as in the case shown in FIG. 13.

As an elastic member forming the above-mentioned elastic holding member 200', for example, polyester elastomer, etc. can be used.

With the above-mentioned configuration, the self moving force (locomotive faculty) of the vibrator 101 of the ultrasonic linear motor 100 can reach the third movable lens frame 19.

When the drive transmission member to the third movable lens frame 19 of the vibrator 101 is configured as the holding member shown in FIG. 13 or FIG. 14, it has advantages of that it is not necessary to perform mechanical processing for mounting the pin member 113 for retrieval of the traveling output on the vibrator 101.

In FIGS. 13 and 14, the vibrator 101 is enclosed by elastic means. However, when high precision is not requested for the stop position of a mobile object (third movable lens frame 19 according to the present embodiment) driven by the ultrasonic linear motor 100, there is no problem if there is some space between the holding member and the vibrator. In this case, it is not necessary that the holding member has to be made of an elastic member.

Figure 15:
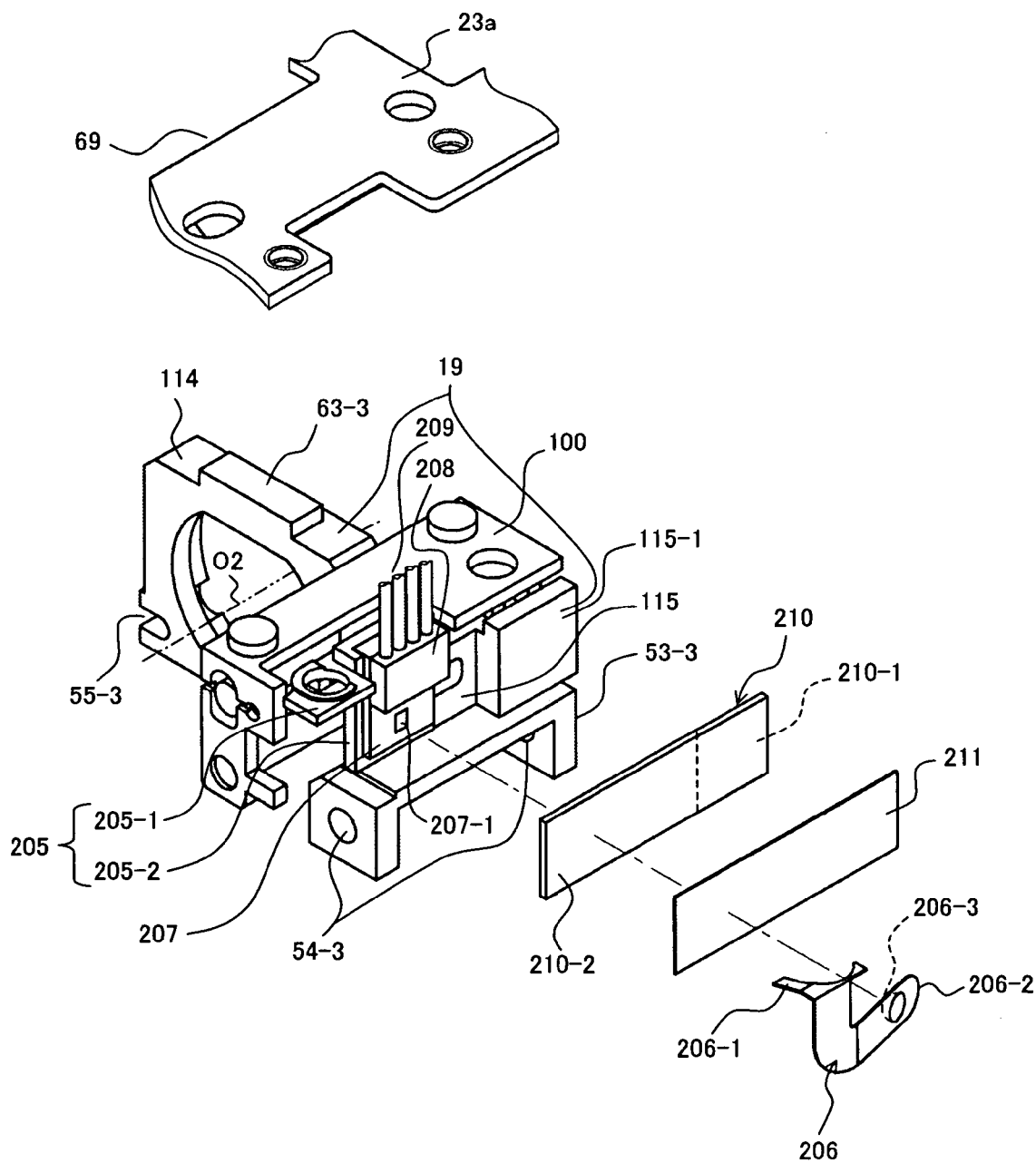
FIG. 15 is a partial exploded perspective view of the detailed configuration of the magnetic sensor according to an embodiment of the present invention shown together with the ultrasonic linear motor and the third movable lens frame.

FIG. 15 is a partial exploded perspective view showing the detailed configuration of the magnetic sensor unit 47 shown in FIGS. 3 and 4 together with the ultrasonic linear motor 100 into which the magnetic sensor unit 47 is incorporated and the third movable lens frame 19.

The magnetic sensor unit 47 is provided for detecting the transfer distance of the third movable lens frame 19 from the initial position after the photo-sensor 73 shown in FIG. 3 detects the initial position of the third movable lens frame 19.

As shown in FIG. 15, the ultrasonic linear motor 100 is arranged between the side of the lens frame body 114 of the third movable lens frame 19 and the engagement projection unit 115 as described in FIGS. 12 and 13. Then, in FIG. 15, the ultrasonic linear motor 100 is fixed to the metal frame 23a together with a magnetic sensor holder 205 (205-1, 205-2).

A engaging unit 206-1 of a leaf spring 206 is engaged with the horizontal plane unit 205-1 of the magnetic sensor holder 205, and the vertical plane unit 205-2 of the magnetic sensor holder 205 holds a magnetic sensor 207. A detection unit 207-1 is formed to detect magnetic substantially at the center of the magnetic sensor 207. From above the detection unit 207-1, four electrode lead wires 209 are obtained with an electric connection with the magnetic sensor 207 enforced by an adhesive agent 208.

An engaging unit 210-1 of a magnetic scale 210 is adhered to a scale holding unit 115-1 forming a flat portion as projecting outside (diagonally lower right in FIG. 15) at a predetermined step from the engagement projection unit 115 rising (in the form set below because it is viewed upside down in FIGS. 12 through 14) from the bearing 53-3 of the third movable lens frame 19, thereby fixing the magnetic scale 210 to the scale holding unit 115-1 with the scale surface facing the detection unit 207-1 of the magnetic sensor 207.

The magnetic scale 210 is formed by an elastic sheet member, for example, a resin sheet of polyester, etc. A magnetic is applied to the scale surface, and the magnetic is magnetized at predetermined intervals. To allow the magnetic sensor 207 to read the magnet, it is desired that the scale surface of the magnetic scale 210 is closest possible to the detection unit 207-1 of the magnetic sensor 207.

The magnetic scale 210 is fixedly mounted on the third movable lens frame 19 through the scale holding unit 115-1 while the magnetic sensor 207 is fixed to the metal frame 23a for which the third movable lens frame 19 are arranged as movable along the two guide shafts (65, 68) as described above, thereby arranging the magnetic sensor 207 and the magnetic scale 210 as relatively movable.

As shown in FIG. 15, the magnetic scale 210 configuring the encoder and the magnetic sensor 207 are laid on the side of the third movable lens frame 19 together with the ultrasonic linear motor 100 moving and driving the third movable lens frame 19.

Furthermore, the positional relationship between the ultrasonic linear motor 100 and the encoder is described below. That is, as described before, the ultrasonic linear motor 100 is provided between the lens frame body 114 of the third movable lens frame 19 and the engagement projection unit 115 where the coupling member such as the pin member 113, the leaf spring 117, etc. are arranged, and the magnetic sensor 207 is arranged substantially parallel to the second optical axis O2 outside the engagement projection unit 115 of the third movable lens frame 19. Thus, the device can be downsized.

On the reverse of the magnetic scale 210, as shown in FIG. 15, it is desired that non-magnetic metal foil 211 with a smooth surface is adhered. The magnetic scale 210 to which the metal foil 211 is adhered is fixed to the scale holding unit 115-1 by the engaging unit 210-1.

Furthermore, the leaf spring 206 is provided with a spring unit 206-2 extending downward from the engaging unit 206-1 and horizontally extending like a hook. At the end of the spring unit 206-2, a dome-shaped convex portion 206-3 projecting toward the magnetic scale 210 is formed. The convex portion 206-3 is formed in the position corresponding to the detection unit 207-1 of the magnetic sensor 207.

By the engaging unit 206-1 of the leaf spring 206 being fixed to the metal frame 23a together with the magnetic sensor holder 205-1, the convex portion 206-3 of the leaf spring 206 presses the portion not fixed to the engaging unit 210-1 of the magnetic scale 210, that is, a free end side 210-2 through the metal foil 211 against the detection unit 207-1 of the magnetic sensor 207.

Thus, the scale surface of the magnetic scale 210 relatively moves while sliding to the detection unit 207-1 of the magnetic sensor 207.

Thus, by the scale surface of the magnetic scale 210 contacts and moves to the detection unit 207-1 of the magnetic sensor 207, the magnetic sensor 207 can more correctly read the scale of the magnetic scale 210.

Furthermore, since the portion of the leaf spring 206 pressing the back of the scale surface through the metal foil 211 is formed by the dome-shaped convex portion 206-3, the friction resistance with the metal foil 211 can be minimized, thereby reducing the resistance load generated by the pressure.

Since the non-magnetic metal foil 211 having a smooth surface is adhered to the pressed back of the scale surface, the wear by the friction with the leaf spring 206 can be reduced, thereby prolonging the life of the device.

FIG. 16 shows an example of a variation of the above-mentioned magnetic sensor unit. The magnetic sensor unit shown in FIG. 16 has a resin layer 212 on the back of the scale surface replacing the metal foil 211 adhered to the back of the scale surface of the magnetic scale 210 as shown in FIG. 15. The resin layer 212 can be formed by, for example, fluorine resin, etc. Since resin produces a smooth surface with less friction resistance, and is very smooth, the resin layer 212 can also reduce the resistance load generated by the pressure.

Figure 17:
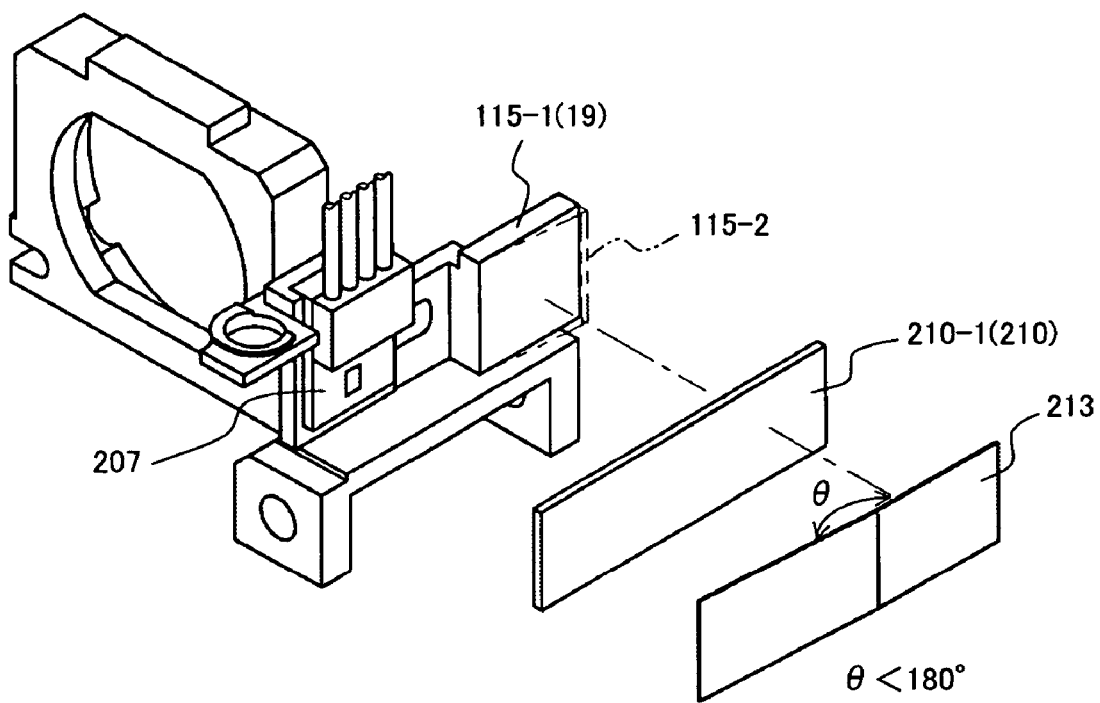
FIG. 17 shows an example of a variation (2) of the magnetic sensor according to an embodiment of the present invention.

FIG. 17 shows an example of a variation of a magnetic sensor unit. In the example shown in FIG. 17, the leaf spring 206 shown in FIGS. 15 and 16 is replaced with an nonmagnetic elastic metal sheet 213 integrally placed on the opposite side of the scale surface of the magnetic scale 210.

The elastic metal sheet 213 is directed at an angle θ smaller than 180° from the central point such that both ends are closer to the magnetic sensor 207 than the center. At the end portion of the engaging unit 210-1 of the magnetic scale 210, it is incorporated into the magnetic scale 210.

Thus, using the property of the spring of the elastic metal sheet 213, the magnetic scale 210 is appropriately pressed against the magnetic sensor 207, thereby propelling the variable portion of the scale surface of the magnetic sensor 207 to contact the detection unit 207-1 of the magnetic sensor 207.

The elastic metal sheet 213 is not limited to metal, but can be a resin elastic sheet.

The scale holding unit 115-1 of the third movable lens frame 19 can also be configured such that the free end side of the magnetic scale 210 can be closer to the magnetic sensor 207 by inclining the magnetic scale 210 to be held by the scale holding unit 115-1 by lowering the step on the magnetic sensor 207 side to form the slope surface 115-2 inclined from upper right to lower left with one end of the magnetic scale 210 fixed to the slope surface 115-2.

In this case, the elastic metal sheet 213 is adhered to the back of the magnetic scale 210 without bending it.

Thus, the magnetic scale 210 can stably contact the detecting unit 207-1 of the magnetic sensor 207 without a pressing member, etc. such as the leaf spring 206 shown in FIG. 15, thereby reducing the cost and downsizing the entire device.

With any configuration shown in FIGS. 15 through 17, the friction resistance between the magnetic sensor 207 and the magnetic scale 210 can be reduced by elastically pressing the magnetic scale 210 against the magnetic sensor 207, and a desired position signal can be obtained by magnetism with a simple configuration while absorbing the displacement from the magnetic sensor 207 when the third movable lens frame 19 moves.

As described above, according to the present invention, a support portion can be configured by a metal frame and a mold unit incorporated into the metal frame, and so much so that all members are supported by the support portion comprised by metal frame and a mold part molded integral with the metal frame and are arranged without excess space along the optical axis directed almost on the square in the longitudinal direction after incoming from the short direction of the device body, the lens-implement can be slimmer and the digital camera containing the lens-implement can be the slimmer.

Since the forward-backward movement of the zoom movable lens frame can be performed by a long shaft cam having cam grooves around, the shaft cam is arranged parallel to the two guide shafts supporting the entire lens frame along the forward-backward movement of the movable lens frame for a zoom, and close to the lens frame, and the drive source of the shaft cam is arranged using the idle space on the back of the prism for bending the direction of the optical axis, the axial form members are adjacent and parallel to each other, and the drive source is arranged in the idle space. Therefore, a lens-implement and a digital camera using the lens-implement provided a zoom mechanism provided the slim structure of the lens mechanism of the bent-optical-axis optical system are able to realize to holdout.

Furthermore, since a ultrasonic linear motor with a self-moving vibrator is loaded, and the vibrator and the lens frame can be coupled with a pin member or an holding member, a lens-implement having the configuration appropriate for a ultrasonic linear motor and a simple coupling mechanism and a digital camera with the lens-implement can be provided.

Additionally, so much so that the scale surface of the magnetic scale and the detection unit of the magnetic sensor slide on each other by elastically pressing the magnetic scale against the magnetic sensor in the magnetic scale and the magnetic sensor forming an encoder, the friction resistance between the magnetic sensor and the magnetic scale can be reduced with a simple configuration, the displacement from the magnetic sensor when the movable lens frame moves is absorbed, the magnetic sensor constantly and correctly reads the magnetic scale, and a desired position signal of the movable lens frame can be obtained. Therefore, an encoder capable of detecting a correct transfer position all the time, a lens-implement having the encoder, and a digital camera having the lens-implement can be successfully provided.

What is claimed is:

1. The lens-implement comprising:
   a reflective optical element for directing an optical axis of incident light by reflecting the incident light having a first optical axis such that the reflected light has a second optical axis different from the first optical axis;
   a movable lens frame arranged on the second optical axis, and arranged as movable along the second optical axis; and
   a drive unit for driving the movable lens frame, wherein:
   the drive unit comprises a cam member as an axis with a cam portion for positioning the movable lens frame formed on the circumference, and a motor for rotating the cam member;
   the cam member is configured such that a central axis of the cam member is arranged parallel to the second optical axis near the reflective optical element; and
   the cam member is arranged such that a part of the cam member is adjacent to a side of the reflective optical element at least in an axis direction, and wherein the central axis of the cam member is arranged outside any element of the movable lens frame.

2. The lens-implement according to claim 1, wherein
   a fixedly held lens frame hold the reflective optical element;
   the fixedly held lens frame further comprises a bearing unit for supporting the cam member as movable on an axis.

3. The lens-implement according to claim 2, wherein
   the fixedly held lens frame comprises a slope portion along a reflective surface of the reflective optical element;
   the motor is close to the slope portion, and arranged on an opposite side of the reflective optical element, and an output axis is arranged parallel to the second optical axis.

4. The lens-implement according to claim 1, further comprising
   a guide shaft mounted adjacent to the cam member and parallel to an axis of the cam member for regulating a movement of the movable lens frame in the second optical axis.

5. The lens-implement according to claim 1, further comprising:
   a light amount restriction member for regulating an amount of passing light of the reflected light; and
   a light amount restriction drive unit for driving the light amount restriction member, wherein
   the light amount restriction drive unit is arranged in a axis direction of the cam member.

6. The lens-implement according to claim 1, wherein
   the movable lens frame is a lens frame for zoom ratio adjustment.

7. The lens-implement according to claim 6, wherein:
   the movable lens frame has a plurality of lens frames; and
   the cam member has a cam corresponding to the plurality of lens frames.

8. The lens-implement according to claim 6, further comprising
   a lens frame for focusing on a capturing side of the movable lens frame as freely movable in a direction of a second optical axis, wherein
   the drive member for moving the lens frame for focusing is arranged on a capturing side in a direction of the axis of the cam member.

9. The lens-implement according to claim 8, wherein
   the fixedly held lens frame comprises a slope portion along a reflective surface of the reflective optical element;
   the motor is close to the slope portion, and arranged on an opposite side of the reflective optical element, and an output axis is arranged parallel to the second optical axis.

10. A lens-implement comprising:
    a lens frame provided as freely movable in an optical axis direction;
    a self-moving unit for freely moving in a direction parallel to the optical axis;
    a coupling unit having a movement transmission member one end of which is fixed to the self-moving unit while the other end of which touches the lens frame and a propelling member for propelling the movement transmission member to the touch portion of the lens frame with a view to coupling the self-moving unit with the lens frame, wherein:
    the self-moving unit is a vibrator of an ultrasonic linear motor; and
    the movement transmission member is a hollow or solid pillar member one end of which is directly fixed to a vibrator, of the ultrasonic linear motor.

11. The lens-implement according to claim 10, wherein
    the pillar member is mounted in a position of a node of ultrasonic vibration of the vibrator.

12. The lens-implement according to claim 10, wherein
    the vibrator is rectangular parallelepiped, two opposite planes forming the rectangular parallelepiped hold the vibrator through a plurality of moving contacting portions, two guide shafts guiding a movement of the vibrator are arranged parallel to a traveling direction of the vibrator, and the pin member is fixed to a substantially central position on one plane not facing the two guide shafts of the vibrator.

13. A lens-implement, comprising:
a lens frame mounted as freely movable in an optical axis direction;
a self-moving unit for freely moving in a direction parallel to the optical axis; and
a coupling unit, provided for the lens frame, for enclosing two outer surfaces of the self-moving unit and coupling the self-moving unit with the lens frame, wherein:
the self-moving unit is a vibrator of an ultrasonic linear motor, and the coupling unit directly encloses the vibrator;
the vibrator is rectangular parallelepiped; and
the coupling unit directly encloses the vibrator in two surfaces normal to a moving direction.

14. The lens-implement according to claim 13, wherein
two guide shafts enclosing two opposite surfaces of the vibrator through a plurality of driving contacting parts and guiding a movement of the vibrator are arranged parallel to a moving direction, and the coupling unit encloses the vibrator between the two parallel guide shaft.

15. The lens-implement according to claim 13, wherein
the coupling unit is provided with an elastic member in a position in which the vibrator is enclosed.

16. The lens-implement according to claim 13, wherein
the self-moving unit is made of an elastic member.

17. The digital camera, wherein
the lens-implement according to claim 13 is loaded as a image capturing lens-implement.

* * * * *